(12) United States Patent
Hu et al.

(10) Patent No.: US 12,229,338 B2
(45) Date of Patent: *Feb. 18, 2025

(54) DETECTING USER INPUT FROM MULTI-MODAL HAND BIO-METRICS

(71) Applicant: Doublepoint Technologies Oy, Helsinki (FI)

(72) Inventors: Jamin Hu, Helsinki (FI); Ville Klar, Helsinki (FI); Eemil Visakorpi, Helsinki (FI); Lauri Tuominen, Helsinki (FI)

(73) Assignee: Doublepoint Technologies Oy, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/110,979

(22) Filed: Feb. 17, 2023

(65) Prior Publication Data
US 2023/0297167 A1 Sep. 21, 2023

Related U.S. Application Data

(63) Continuation-in-part of application No. 17/694,758, filed on Mar. 15, 2022, now Pat. No. 11,635,823.

(51) Int. Cl.
*G06F 3/01* (2006.01)
*G06F 1/16* (2006.01)
*G06N 3/045* (2023.01)

(52) U.S. Cl.
CPC .............. *G06F 3/014* (2013.01); *G06F 1/163* (2013.01); *G06F 3/017* (2013.01); *G06N 3/045* (2023.01)

(58) Field of Classification Search
CPC .......... G06F 1/163; G06F 3/014; G06F 3/017; G06F 3/015; G06F 3/016; G06F 3/04883; G06F 3/011; G06N 3/045; H05K 1/141; A61B 5/7275

See application file for complete search history.

(56) References Cited

U.S. PATENT DOCUMENTS

| 10,948,976 | B1* | 3/2021 | Whitmire | G06F 3/016 |
| 2009/0326406 | A1 | 12/2009 | Tan et al. | |
| 2009/0327171 | A1* | 12/2009 | Tan | G06F 3/015 |
| | | | | 706/12 |
| 2013/0317648 | A1* | 11/2013 | Assad | G06F 3/011 |
| | | | | 700/258 |
| 2014/0240103 | A1* | 8/2014 | Lake | G06F 1/163 |
| | | | | 340/12.5 |
| 2015/0169074 | A1 | 6/2015 | Ataee et al. | |

(Continued)

FOREIGN PATENT DOCUMENTS

| EP | 3203350 A1 | 8/2017 |
| JP | 2008027252 A | 2/2008 |

(Continued)

*Primary Examiner* — Richard J Hong
(74) *Attorney, Agent, or Firm* — Laine IP Oy

(57) ABSTRACT

According to an example aspect of the present invention, there is provided an input device and corresponding method which digitizes and transforms minute hand movements and gestures into user interface commands without interfering with the normal use of one's hands. The device and method may, for example, determine user actions based on detected user action characteristics from a plurality of sensors, where the sensors are preferably of different types.

19 Claims, 12 Drawing Sheets

(56) References Cited

U.S. PATENT DOCUMENTS

| | | |
|---|---|---|
| 2015/0182160 A1 | 7/2015 | Kim et al. |
| 2015/0242120 A1 | 8/2015 | Rodriguez |
| 2015/0301606 A1 | 10/2015 | Andrei |
| 2015/0370326 A1 | 12/2015 | Chapeskie et al. |
| 2016/0313801 A1 | 10/2016 | Wagner et al. |
| 2017/0045946 A1 | 2/2017 | Smoot et al. |
| 2017/0090567 A1 | 3/2017 | Allec et al. |
| 2017/0147075 A1* | 5/2017 | Lerner .................... G06F 3/017 |
| 2018/0307314 A1 | 10/2018 | Connor |
| 2019/0033974 A1 | 1/2019 | Mu et al. |
| 2019/0228533 A1 | 7/2019 | Giurgica-Tiron et al. |
| 2020/0073483 A1 | 3/2020 | Berenzweig et al. |
| 2020/0293114 A1* | 9/2020 | Bean ................... G06F 3/04883 |
| 2020/0401087 A1 | 12/2020 | Mun et al. |
| 2021/0124417 A1* | 4/2021 | Ma .......................... G06F 3/015 |
| 2021/0193977 A1* | 6/2021 | Reykhert ............... H05K 1/141 |
| 2021/0311564 A1 | 10/2021 | Kawamoto et al. |
| 2021/0353162 A1* | 11/2021 | Tan ....................... A61B 5/7275 |
| 2021/0373663 A1 | 12/2021 | Matusik et al. |

FOREIGN PATENT DOCUMENTS

| | | |
|---|---|---|
| JP | 2016507851 A | 3/2016 |
| JP | 2021535465 A | 12/2021 |

\* cited by examiner

DETECTING USER INPUT FROM MULTI-MODAL HAND BIO-METRICS

RELATED APPLICATIONS

This application is a continuation-in-part of U.S. patent application Ser. No. 17/694,758, filed Mar. 15, 2022, and hereby incorporated by reference in its entirety.

FIELD

Various example embodiments of this disclosure relate to a wearable apparatus and a method, where the apparatus and method are usable for controlling devices, in particular in the field of computing and extended reality user interface applications. Extended reality, XR, includes augmented reality, AR, virtual reality, VR, and mixed reality, MR.

BACKGROUND

Traditionally, digital devices have been controlled with a dedicated physical controller. For example, a computer can be operated with a keyboard and mouse, a game console with a handheld controller, and a smartphone via a touchscreen. Usually, these physical controllers comprise sensors and/or buttons for receiving inputs from the user based on the user's actions. Such discrete controllers are ubiquitous, but they impede human-machine-interaction by adding a redundant layer of technology between the user's hands and the computation device. Additionally, such dedicated devices are typically only suited for controlling a specific device. Also, such devices may, for example, impede the user, so that the user is unable to use his hand(s) for other purposes when using the control device.

SUMMARY OF THE INVENTION

In view of the above-mentioned issues, improvements are needed in the field of XR user interfaces. A suitable input device, such as the invention disclosed herein, directly digitizes and transforms minute hand movements and gestures into machine commands without interfering with the normal use of one's hands. The embodiments of the present disclosure may, for example, detect user actions based on detected user action characteristics from a plurality of sensors, where the sensors are preferably of different types.

The invention is defined by the features of the independent claims. Some specific embodiments are defined in the dependent claims.

According to a first aspect of the present invention, there is provided a multimodal biometric measurement apparatus, the apparatus comprising: a mounting component configured to be worn by a user, at least one wrist contour sensor, at least one bioacoustic sensor comprising a vibration sensor, at least one inertial measurement unit, IMU, comprising an accelerometer and gyroscope, and a controller comprising at least one processor and at least one memory including computer program code, the at least one memory and the computer program code configured to with the at least one processor, to cause the controller at least to: receive a first sensor data stream from the at least one wrist contour sensor, receive a second sensor data stream from the at least one bioacoustic sensor, receive a third sensor data stream from the at least one inertial measurement unit, wherein the first, the second and the third sensor data stream are received concurrently, and determine, based on at least one of the first, the second and the third sensor data stream, at least one characteristic of an user action, determine, based on the determined at least one characteristic of an user action, at least one user action, and generate at least one user interface, UI, command, based at least in part on the determined at least one user action.

According to a second aspect of the present invention, there is provided a method to generate UI commands, the method comprising: receiving a first sensor data stream from at least one wrist contour sensor, receiving a second sensor data stream from at least one bioacoustic sensor, receiving a third sensor data stream from at least one inertial measurement unit, wherein the first, the second and the third sensor data stream are received concurrently, and determining, based on at least one of the first, the second and the third sensor data stream, at least one characteristic of an user action, and determining, based on the determined at least one characteristic of a user action, at least one user action, and generating at least one user interface, UI, command, based at least in part on the determined at least one user action.

According to a third aspect of the present invention, there is provided a non-transitory computer readable medium having stored thereon a set of computer readable instructions, that when executed on a processor cause the second aspect to be performed or an apparatus comprising the processor to be configured in accordance with the first aspect.

EMBODIMENTS

Figure 1A:
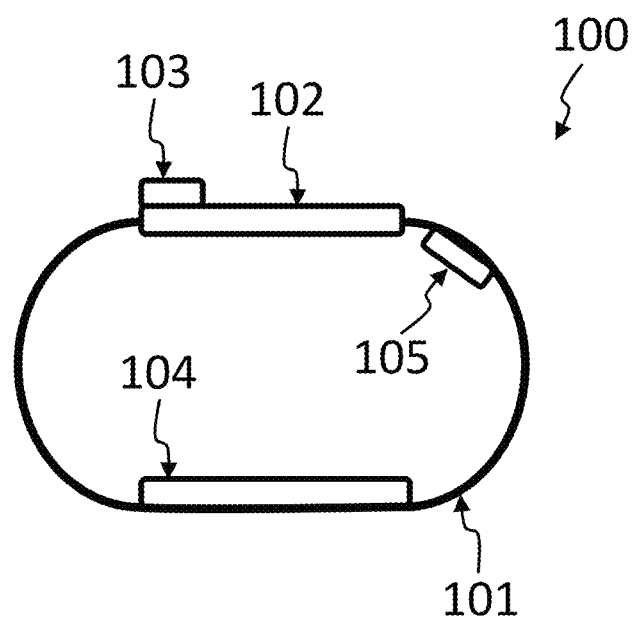
FIGS. 1A and 1B illustrate schematic views of an example apparatus 100 capable of supporting at least some of the embodiments of the present invention.

A multimodal biometric measurement apparatus and a corresponding method are described herein. The apparatus and/or method may be used for at least one of the following, for example: measurement, sensing, signal acquisition, analysis, user interface tasks. Such an apparatus is preferably suitable for a user to wear. The user may control one or more devices using said apparatus. The control may be in the form of a user interface, UI, or a human-machine interface, HMI. The apparatus may comprise one or more sensors. The apparatus may be configured to generate user interface data based on data from said one or more sensors. The user interface data may be used at least in part to allow the user to control the apparatus or at least one second apparatus. The second apparatus may be, for example, at least one of: a personal computer, PC, a server, a mobile phone, a smartphone, a tablet device, a smart watch, or any type of suitable electronic device. A controlled or controllable apparatus may perform at least one of: an application, a game, and/or an operating system, any of which may be controlled by the multimodal apparatus.

A user may perform at least one user action. Typically, the user will perform an action to affect the controllable apparatus. A user action may comprise, for example, at least one of: a movement, a gesture, an interaction with an object, an interaction with a body part of the user, a null action. An example user action is the "pinch" gesture, where the user touches the tip of the index finger with the tip of the thumb. Another example is a "thumbs up" gesture, where the user extends his thumb, curls his fingers and rotates his hand so that the thumb is pointing upwards. The embodiments are configured to identify (determine) at least one user action, based at least in part on sensor input. Reliable identification of user actions enables action-based control, for example using the embodiments disclosed herein.

A null action may be understood as at least one of the following: the absence of a user action, and/or a user action which does not affect the application state of the apparatus or application to be controlled. In other words, the null action corresponds to an entry called "none" in at least one of: a list of predetermined user actions, a list of user interface commands and/or the set of classified gestures. The apparatus may be configured so that a set of probabilities comprises a probability assigned to "none", instead of just having probabilities/confidence values for each gesture in the set. For example, if the application prompts the user to "pinch to accept choice" and the user performs normal hand movements that do not include a pinch gesture, the apparatus attributes a null action to these movements. In such a situation, the apparatus may be configured to, for example, send nothing to the application. In another example, if the user is scrolling through a list and then performs an action not relevant to the list, the performed action may be identified as a null action. The event interpreter of the apparatus is configured to identify and/or manage null actions, optionally based at least in part on received contextual information from the application.

A user action may comprise at least one characteristic, termed a user action characteristic and/or an event. Such a characteristic may be, for example, any of the following: temporal, locational, spatial, physiological, and/or kinetic. A characteristic may comprise an indication of a body part of a user, such as a finger of the user. A characteristic may comprise an indication of a movement of the user. For example, a characteristic may be: middle finger movement. In another example, a characteristic may be: circular movement. In yet another example, a characteristic may be: a time prior to an action, and/or a time after an action. In at least some of the embodiments, a characteristic of a user action is determined, for example by a neural network, based at least in part on sensor data.

In at least some of the embodiments, a user interface, UI, command is generated based on the user action. The UI command may be termed, for example, a human-machine interface, HMI, command, a user interface interaction, and/or an HMI interaction. Such a command is usable to communicate user interface actions. For example, a user interface action may correspond to an "enter" key on a personal computer. In at least some embodiments, an output generator, for example a user interface command generator, is used to map the user action to the predetermined user interface action, and/or to generate a user interface command based on the predetermined user interface action. Thus, the controlled device need not understand the user action, only the UI command, which may be provided in a standard format such as human interface device, HID, report descriptors. The UI command may comprise, for example, a data packet and/or frame comprising a UI instruction.

In at least some of the embodiments, the apparatus comprises a mounting component configured to be worn by a user. The mounting component is thus a wearable component. Such a component may be any of the following: a strap, a band, a wristband, a bracelet, a glove. The mounting component may be attached to and/or formed by another apparatus such as a smartwatch, or form part of a larger apparatus such as a gauntlet. In some embodiments, a strap, a band, and/or a wristband has a width of 2 to 5 cm, preferably 3 to 4 cm, more preferably 3 cm.

In the embodiments, signals are measured by at least one sensor. Said sensor may comprise or be connected to a processor and memory, where the processor may be configured so that the measuring is performed. Measuring may be termed sensing or detecting. Measuring comprises, for example, detecting changes in at least one of: the user, the environment, the physical world. Measuring may further comprise, for example, applying at least one timestamp to sensed data, transmitting said sensed data (with or without the at least one timestamp).

At least some embodiments are configured to measure a wrist contour of a user. The wrist contour is the three-dimensional surface profile around the wrist. It is defined as at least one of: a point cloud, mesh or other surface representation, of topology of the exterior tissue adjacent to and/or within the proximity of the radiocarpal, ulnocarpal and distal radioulnar joints. In practice, for example, the wrist contour is the exterior shape of the wrist. The wrist contour may be measured from the wrist area of a user. The wrist area may comprise, for example, an area starting from a bottom end of the palm of the user to a few centimeters below the bottom end of the palm of the user. When the user performs an action with the hand connected to the wrist, the surface of the wrist deforms in response to the tendon and/or muscle movement required for the action. In other words, the wrist contour changes in a measurable way and the wrist contour state corresponds to a user action characteristic. Measurements may be taken continuously, for example from the wrist area, to provide sensor data which can be used by the embodiments. The wrist contour may be measured by, for example, using a matrix of sensors, for example the measuring may be optical, capacitive or piezoelectric proximity or profilometry sensing. Such a matrix may be referred to as a wrist contour sensor. Using multiple sensors, especially in the matrix format, provides the benefit of obtaining an accurate status of the user's wrist with a sufficiently high resolution. Each sensor may provide at least one data channel, and in a preferred embodiment the wrist contour sensor provides at least 32 channels. Said matrix may be placed on the wrist of the user, in particular on the palmar side of the wrist. Such placement may be performed by using, for example, a strap, a wristband, a glove.

At least some embodiments are configured to measure vibration signals and/or acoustic signals. Such signals may be measured, for example, from a user, in particular the wrist area of the user. A bioacoustics sensor may be configured to measure vibrations such as the interior waves within the user and/or surface waves on the skin of the user. Such vibrations may result from, for example, touch events. A touch event may comprise the user touching an object and/or the user touching himself and/or another user. The bioacoustics sensor may comprise a contact microphone sensor (a piezo contact microphone), a MEMS (micro-electro mechanical systems) microphone, and/or a vibration sensor, such as an accelerometer detecting accelerations produced by acoustically vibrating structures (e.g. the user or the mounting component).

At least some embodiments are configured to measure the position and movement of the user by using an inertial measurement unit, IMU. The IMU may be configured to provide position information of the apparatus. The IMU may be termed an inertial measurement unit sensor. The IMU may comprise at least one of the following: a multi-axial accelerometer, a gyroscope, a magnetometer, an altimeter, a barometer. It is preferable that the IMU comprises a magnetometer as the magnetometer provides an absolute reference for the IMU. A barometer, which is usable as an altimeter, may provide additional degrees of freedom to the IMU.

Sensors, such as the inertial measurement unit sensor, the bioacoustics sensor, and/or the wrist contour sensor, may be configured to provide a sensor data stream. The providing may be within the apparatus, for example to a controller, a digital signal processor, DSP, a memory. Alternatively or additionally, the providing may be to an external apparatus. A sensor data stream may comprise one or more raw signals measured by sensors. Additionally, a sensor data stream may comprise at least one of: synchronization data, configuration data, and/or identification data. Such data may be used by the controller to compare data from different sensors, for example.

In at least some of the embodiments, the apparatus comprises a means for providing kinesthetic feedback and/or tactile feedback. Such feedback may comprise, for example, vibration, and may be known as "haptic feedback". The means for providing haptic feedback may comprise, for example, at least one of the following: an actuator, a motor, a haptic output device. A preferred actuator, usable in all embodiments, is a linear resonance actuator, LRA. Haptic feedback may be useful to provide a user with feedback from the user interface which improves the usability of the user interface. Further, haptic feedback may alert the user to events or contextual changes in the user interface.

Figure 1B:
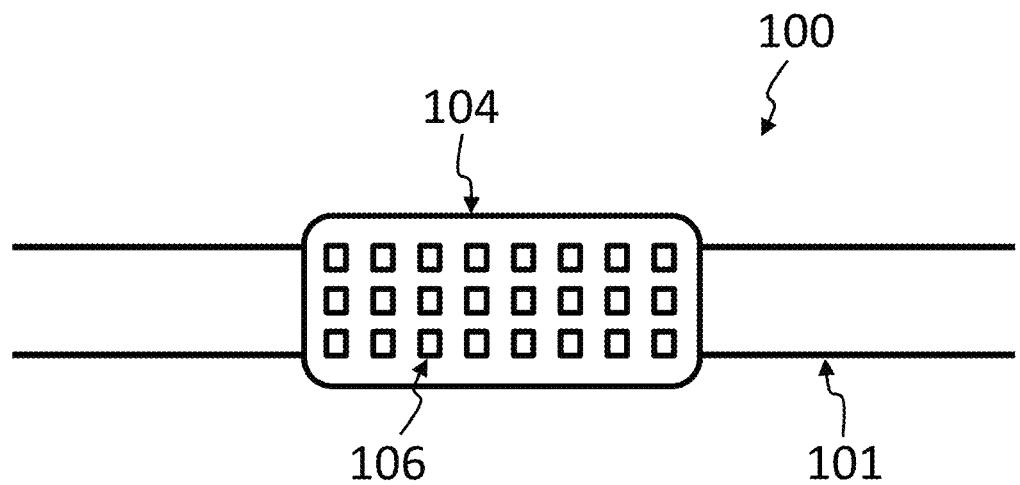

FIGS. 1A and 1B show an apparatus 100 in accordance with at least some embodiments of the present invention. The apparatus 100 may be suitable for sensing user motions and/or actions and acting as a user interface device and/or HMI device. The apparatus 100 comprises a mounting component 101, which in the FIG. 1A is presented in the form of a strap.

The apparatus 100 further comprises a controller 102. Controller 102 comprises at least one processor and at least one memory including computer program code. The controller may be configured so as to cause the controller at least to receive concurrent sensor data streams from the sensors 103, 104 and 105. The controller may be configured to perform preprocessing on at least one of the sensor data streams, wherein the preprocessing may comprise the preprocessing disclosed elsewhere in this document. The controller may be configured to process the received sensor data streams from the sensors. The controller may be configured to generate, based on the characteristics of the of the processed sensor data stream, at least one user interface, UI, event and/or command. Further, the controller may comprise models, which may comprise at least one neural network.

The apparatus 100 further comprises an inertial measurement unit, IMU, 103. The IMU 103 is configured to send a sensor data stream, for example to the controller 102. Said sensor data stream comprises, for example, at least one of the following: multi-axial accelerometer data, gyroscope data, and/or magnetometer data. One or more of the components of the apparatus 100 may be combined, for example the IMU 103 and the controller 102 may be located on the same PCB (printed circuit board). Changes in the IMU data reflect, for example, movements and/or actions by the user, and thus such movements and/or actions may be detected by using the IMU data.

The apparatus 100 further comprises a bioacoustic sensor 105, which in the FIG. 1A is presented in the form of a contact microphone. The sensor 105 is configured to send a sensor data stream, for example to the controller 102. Said sensor data stream comprises, for example, a single-channel audio waveform, or a multi-channel audio waveform. Placement of the sensor 105 with respect to the mounting component may be optimized for signal quality (reducing acoustic impedance) and user comfort. The sensor 105 is configured to have a stable contact with the user, as variance in the contact may result in loud artifacts in the signal. Changes in the bioacoustic data reflect, for example, movements and/or actions by the user, and thus such movements and/or actions may be detected by using the bioacoustic data.

The at least one microphone may be mounted on a dorsal side of the mounting component 101. Other sensors, such as the IMU, may be mounted on an opposite side of the mounting component 101 than the microphone. For example, the microphone 105 may be mounted on an inner circle of the mounting component 101 and the IMU on an outer circle of the mounting component 101. Further, the wrist contour sensor may also be mounted on an inner circle of the mounting component 101. The at least one microphone may be configured to be in contact with skin when the apparatus is worn by a user.

The apparatus 100 further comprises a wrist contour sensor 104, which in the FIG. 1A comprises a matrix of profilometric sensors. Said sensors may be for example proximity sensors, optical sensors. The profilometric sensors may be configured to measure the distance from the sensors to the user's skin. In other words, each profilometric sensor is configured to detect its respective proximity to a surface of the wrist of the user. Actions performed by the user affect the wrist contour in a predictable manner, which in turn affects the distance between each profilometric sensor. Thus, using data from a plurality of profilometric sensors, the wrist contour of the user can be sensed. As the wrist contour status corresponds to actions, for example the movement of a certain finger, such actions can be detected based on the wrist contour sensor data. Further, changes in the wrist contour can also be sensed. The sensor 104 is configured to send a sensor data stream, for example to the controller 102. Said sensor data stream comprises a set of profilometry readings corresponding to a given contour at a given time. The set of readings may comprise, for example, a set of changes to base currents of phototransistors, which are converted into voltage readings using a digital rheostat. Said voltage may be sampled with an ADC, analog-digital converter, chip. A suitable sampling rate (interval) is between 1 ms and 1000 ms, preferably 10 ms.

FIG. 1B illustrates an exemplary configuration of the apparatus 100. The figure shows mounting component 101 and wrist contour sensor 104 comprising a matrix of sensors 106. In the Figure, sensors 106 are shown as optical sensors. The matrix in FIG. 1B is an exemplary 3×8 matrix, having 3 rows and 8 columns. Matrices having between 1 to 10 rows and 1 to 10 columns are well suited for use in the apparatus. Spacing between the rows and columns of the matrix may be from approximately 2 to approximately 10 millimeters. Preferably, matrixes such as a 4 by 8 matrix may be used, in particular a 4 by 8 matrix having a 4-millimeter spacing on the palmar side. The sensors 106 may be distributed in a rectilinear, radial or asymmetric pattern with respect to one another.

For example, the sensors 106 may comprise one or more of: an infrared based proximity sensor, a laser based proximity sensor, an electronic image sensor based proximity sensor, an ultrasound based proximity sensor, a capacitive proximity sensor, a radar based proximity sensor, an accelerometer based proximity sensor, a piezoelectricity based proximity sensor, and/or a pressure based proximity sensor. As an example, the infrared based proximity sensor may comprise a pair of an infrared light-emitting diode (LED) acting as an infrared light emitter and a phototransistor acting as an infrared light receiver. Such an active infrared based proximity sensor may indirectly detect the distance to an object in front of it at close ranges within a few millimeters by shining a cone of infrared light forward with LED, and sensing how much light is reflected back with the phototransistor. In practice, the more light is reflected back, the more current the phototransistor lets through. This property of the phototransistor may be used in series with a resistor for example to create a voltage divider circuit that may be used to measure incident light on the phototransistor with high accuracy. For example, the resolution of the measured proximity to the wrist skin may be as small as 0.1 millimeters. In at least some embodiments, the wrist contour sensor may comprise other sensor types in addition to the infrared based proximity sensors, e.g., to increase the robustness and/or accuracy of the infrared based proximity sensors.

Figure 2A:
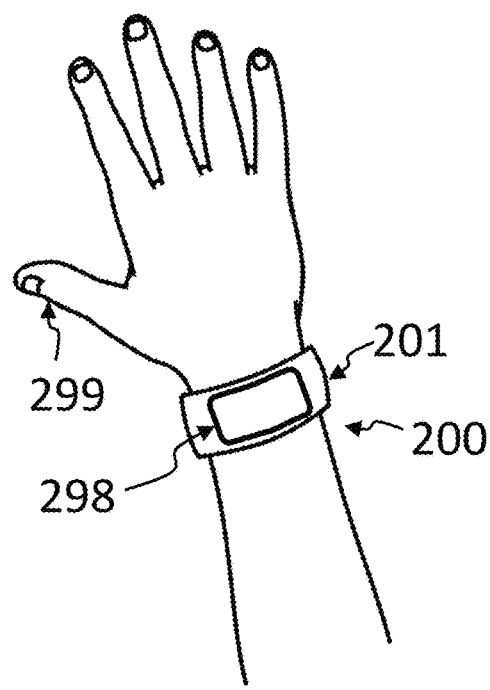
FIGS. 2A-2D illustrate schematic views of an example apparatus 200 capable of supporting at least some of the embodiments of the present invention, the apparatus being worn by a user.

FIG. 2A illustrates an apparatus 200 capable of supporting at least some embodiments of the present invention. Apparatus 200 is similar to apparatus 100. Apparatus 200 is shown being worn on the hand 299 of a user. Apparatus 200 is worn on the wrist of the user via mounting component 201. A protrusion 298 is shown on band 201 which may house or be attached to any of the components of the apparatus 200.

Figure 2B:
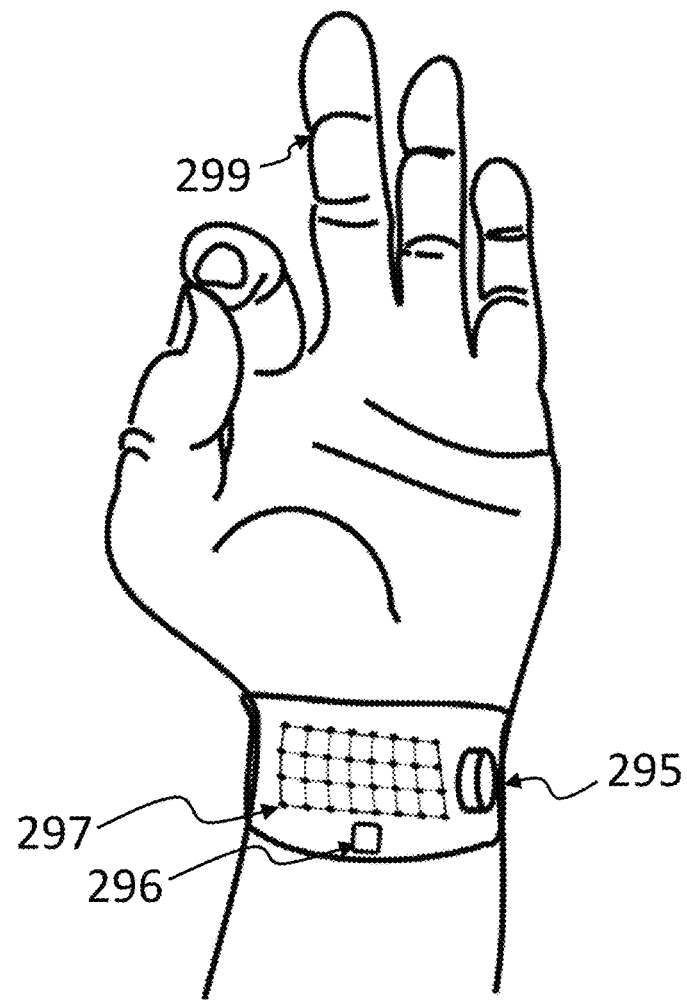

FIG. 2B illustrates exemplary measurement areas of apparatus 200 and the other apparatus disclosed herein. In FIG. 2B, a bioacoustic measurement area 295, an IMU 296 and a wrist contour measurement area 297 are shown in relation to the hand 299 of a user. Wrist contour measurement area 297 is shown in the form of a grid, wherein the points of the grid are the locations of the profilometric sensors, for example sensors 106, and the outline of the grid is the measured wrist contour.

Figure 2C:
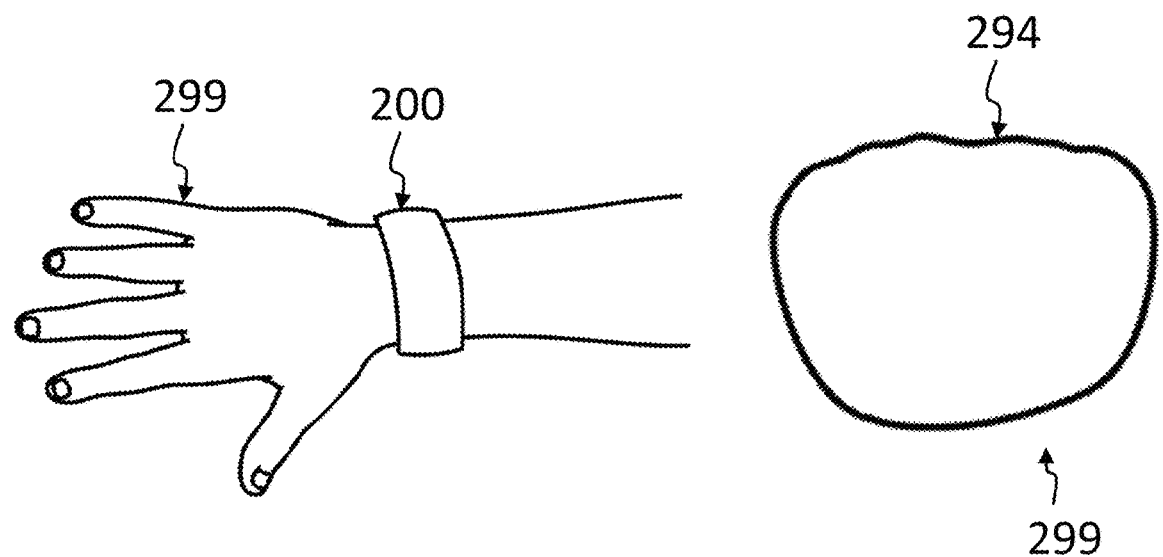
Figure 2D:
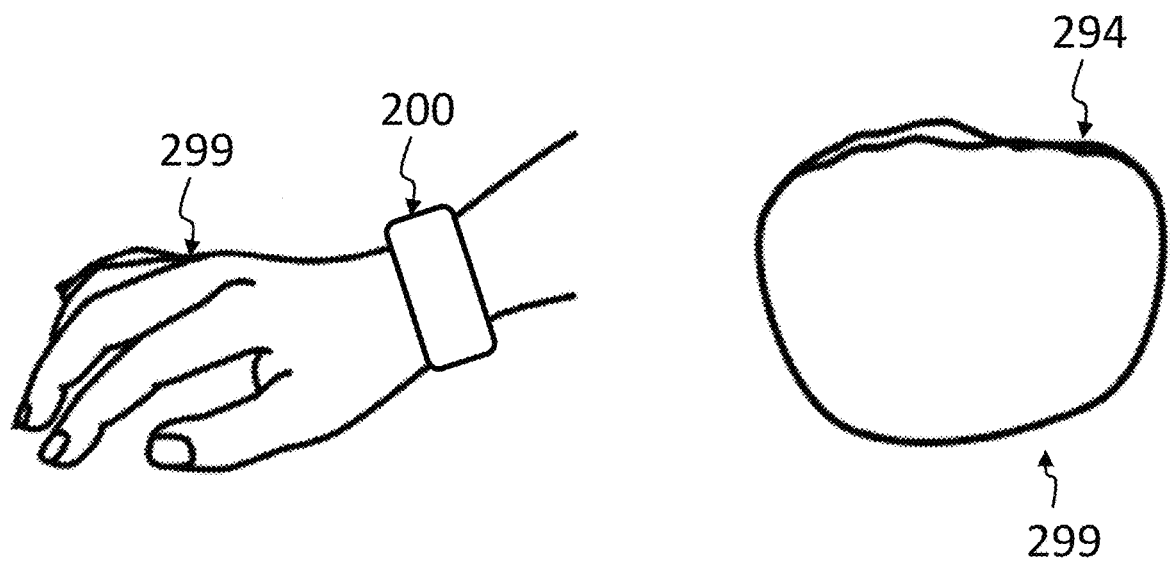

FIGS. 2C and 2D illustrate an exemplary wrist contour of the user. On the left side of the figures, user 299 is seen wearing device 200. On the right side of the figures, the wrist contour 294 of the user 299 is seen. In FIG. 2C, the user's hand is in a first hand pose, which corresponds to the wrist contour seen in that figure. In FIG. 2D, the user's hand is in a second hand pose, which corresponds to the wrist contour seen in that figure. The difference between the poses corresponds to the differences seen between the FIGS. 2C and 2D wrist contours.

Figure 2E:
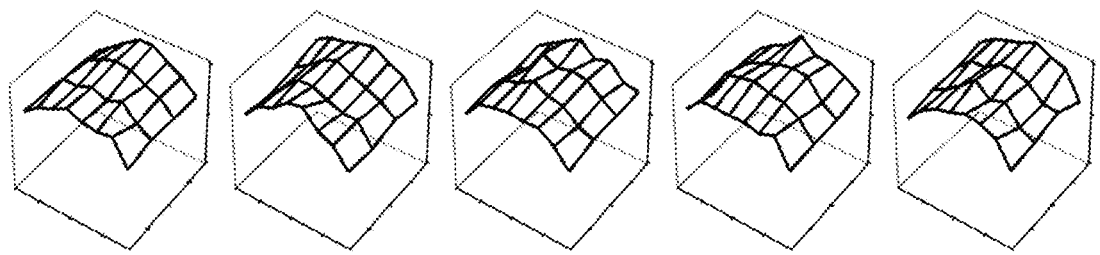
FIGS. 2E-2G illustrate schematic views of exemplary data provided by the example apparatus 200 when worn by a user.

FIG. 2E illustrates an exemplary topology sequence corresponding to an index finger movement of a user, based on measured wrist contour data. The exemplary sequence comprises 5 topologies based on measurement data taken 1 second apart reflecting the change of the contour corresponding to the movement of the user's finger. The exemplary sequence illustrates the sequential data sets provided by a wrist contour sensor as well as the change in the wrist contour which can be determined from the data sets. As seen in the figure, data from each profilometric sensor is represented by a three-dimensional coordinate. Together, the sensors represent a set of coordinates, which may be assembled into a contour. Deformations or changes in the contour can be seen by comparing the contour to a previous contour state. Delta encoding may be used to transmit only the changes relative to a previous data set. In the embodiments, the topology is not necessarily computed. For example, the measured data points, for example 32 points, representing the contour may be inputted as a sensor data set to a convolutional neural network which is trained to output a user action characteristic.

Figure 2F:
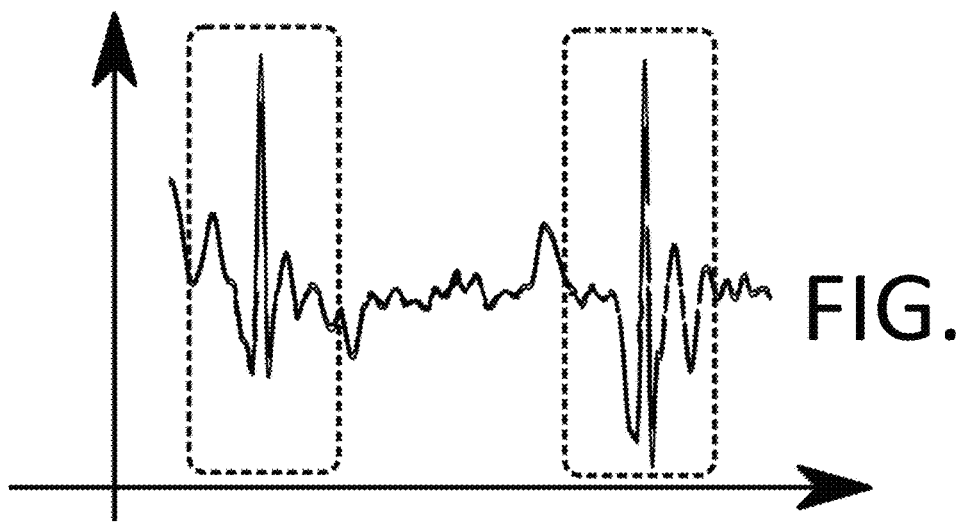

FIG. 2F illustrates an exemplary data set of the bioacoustic measurement. Transient features of an exemplary signal are visualized. In the graph, the X-axis depicts elapsed time, and the Y-axis depicts magnitude, for example voltage. The dotted box in the figure is provided for visualization purposes only, and highlights a region of interest. Within the exemplary region of interest, transient features can be seen. Such features may correspond, for example, to a user pinch action. In some embodiments, the illustrated signal may be preprocessed, for example using fast Fourier transform, FFT.

Figure 2G:
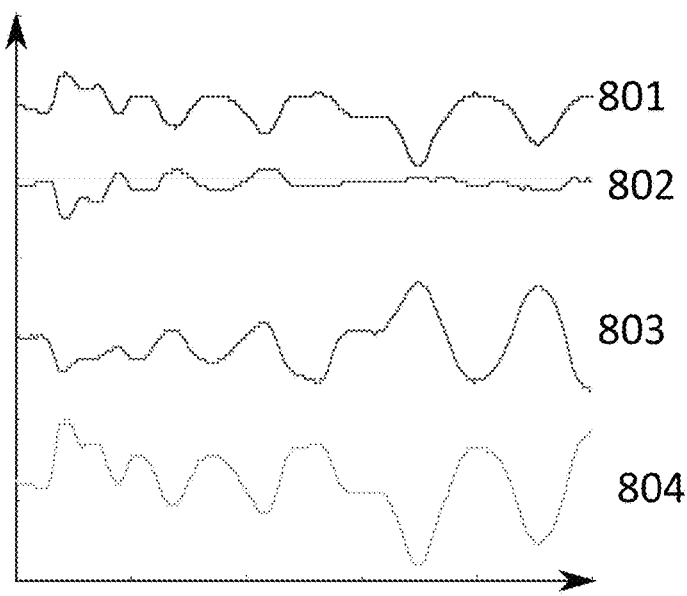

FIG. 2G illustrates an exemplary data set of an IMU during typical hand movement. In the exemplary data set, the orientation data is encoded as quaternions. This data format consists of one scalar component and three vector components. The scalar component encodes the rotation angle and the three vector components, termed basic quaternions, encode the direction of the rotation axis in three-dimensional space. Signal 801 corresponds to the coefficient of the scalar component. Signals 802, 803, 804 correspond to the coefficients of the three basic quaternions. In the graph, X-axis is time and Y-axis is the magnitude of the coefficients. In some embodiments, the wrist quaternions may be used to compute relative three-dimensional rotations with quaternions measured with another IMU mounted on, for example, the users head.

Figure 3A:
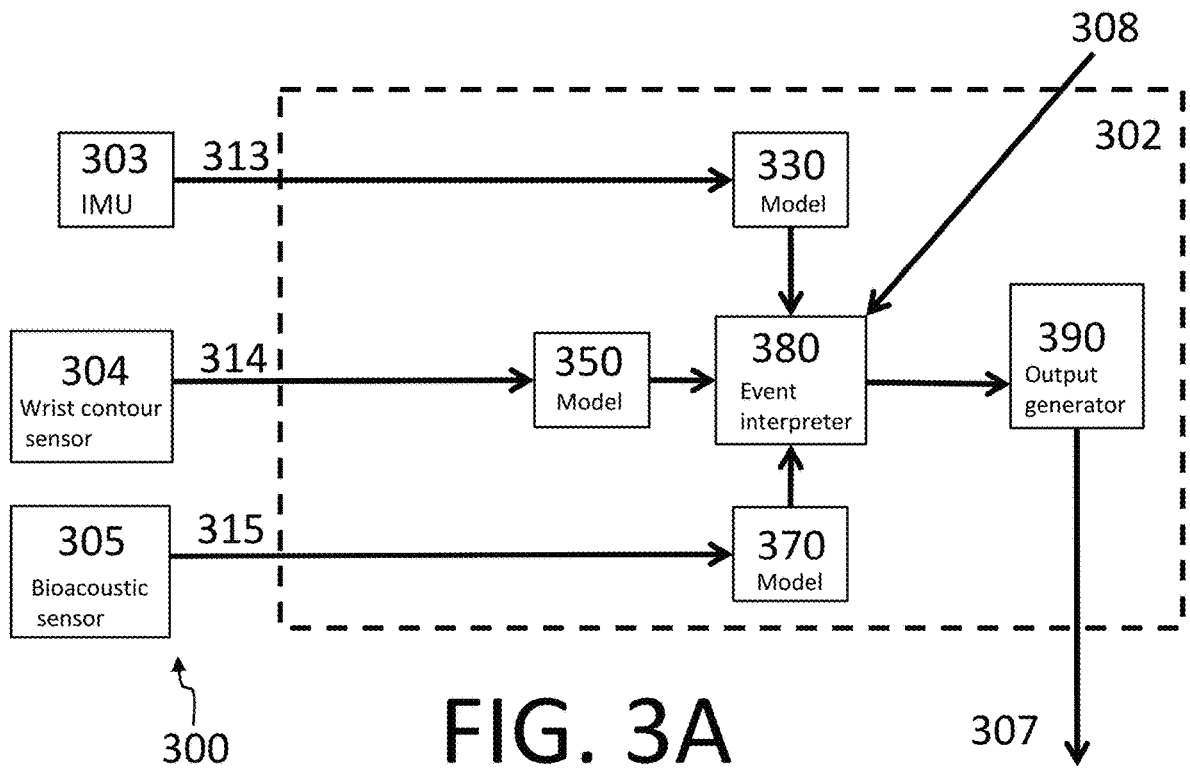
FIGS. 3A and 3B illustrate schematic views of an example apparatus 300 and an example apparatus 400, respectively, said apparatus being capable of supporting at least some of the embodiments of the present invention.
Figure 3B:
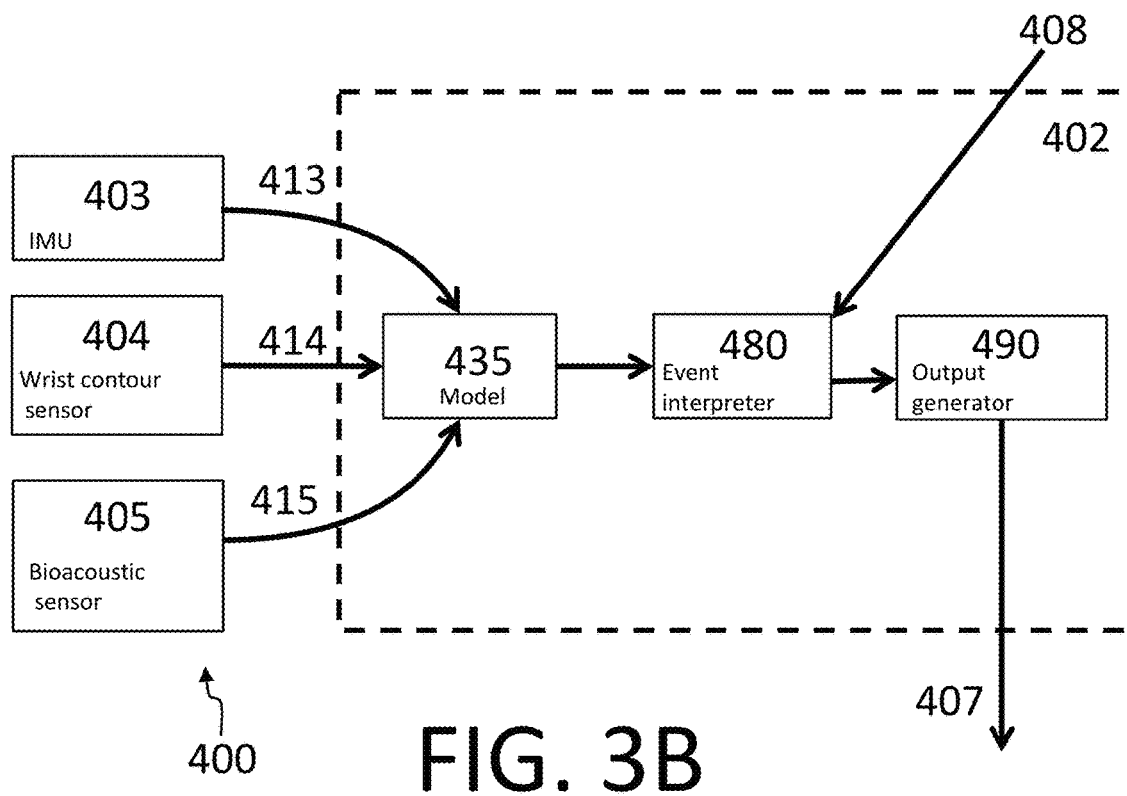

FIGS. 3A and 3B illustrate apparatuses 300 and 400 capable of supporting at least some embodiments of the present invention. Said apparatuses are identical to apparatuses 100 and 200, except when stated otherwise.

In FIG. 3A, an exemplary schematic view of apparatus 300 is shown. Apparatus 300 comprises the IMU 303, the wrist contour sensor 304, the bioacoustics sensor 305, and controller 302. Controller 302 is shown in the figure represented by the dotted line. As shown in the figure, controller 302 may comprise, for example in the memory of the controller, at least the models 350, 330, and 370. Controller 302 may comprise event interpreter 380. Controller 302 may comprise an output generator 390.

Sensors 303, 304 and 305 are each configured to transmit sensor data streams, for example the sensor data streams 313, 314 and 315, respectively. The sensor data streams may be received by the controller 302.

Within the controller 302, the received sensor data streams are directed to at least one model, such as models 350, 330, 370. A model, such as models 350, 330, 370, may comprise a neural network. The neural network may be, for example, a feed-forward neural network, a convolution neural network, or a recurrent neural network, or a graph neural network. A neural network may comprise a classifier and/or regression. The neural network may apply a supervised learning algorithm. In supervised learning, a sample of inputs with known outputs is used from which the network learns to generalize. Alternatively, the model may be constructed using an unsupervised learning or a reinforcement learning algorithm. In some embodiments, the neural network has been trained so that certain signal characteristics correspond to certain user action characteristics. For example, a neural network may be trained to associate a certain wrist contour with a user action characteristic associated with a certain finger, for example the middle finger, as exemplified in FIGS. 2C-2E. A neural network may be trained to provide a confidence level for an outputted user action characteristic.

A model may comprise at least one of: algorithms, heuristics, and/or mathematical models. For example, the IMU model 330 may comprise an algorithm to compute orientation. The IMU may provide tri-axial accelerometer, gyroscope and magnetometer data. A sensor fusion approach may be employed to reduce the influence of intrinsic unideal behavior of particular sensors, such as drift or noise. Sensor fusion may involve use of a complimentary filter, Kalman filter or Mahony & Madgwick orientation filter. Such a model may additionally comprise a neural network as disclosed herein.

A model may comprise, for example, at least one convolutional neural network, CNN, performing inference on the input data, for example the signals received from the sensors and/or preprocessed data. Convolutions may be performed in spatial or temporal dimensions. Features (computed from the sensor data fed to the CNN) may be chosen algorithmically or manually. A model may comprise a further RNN (recurrent neural network), which may be used in conjunction with a neural network to support user action characteristic identification based on sensor data which reflects user activity.

In accordance with this disclosure, the training of a model may be performed, for example, using a labelled data set containing multimodal biometric data from multiple subjects. This data set may be augmented and expanded using synthesized data. Depending on the employed model construction technique, the sequence of computational operations that compose the model may be derived via backpropagation, Markov-Decision processes, Monte Carlo methods, or other statistical methods. The model construction may involve dimensionality reduction and clustering techniques.

The above-mentioned models 330, 350 and 370 are each configured to output a confidence level of a user action characteristic based on the received sensor data stream. The confidence level may comprise one or more indicated probabilities in the form of percentage values associated with one or more respective user action characteristics. The confidence level may comprise an output layer of a neural network. The confidence level may be expressed in vector form. Such a vector may comprise a 1×n vector, populated with the probability values of each user action characteristic known to the controller. For example, model 315, which receives the bioacoustic sensor data stream, may receive a data stream comprising a signal having a brief, high-amplitude portion. Model 315 may interpret said portion of the signal as a "tap" user action characteristic (the user has tapped something) with a confidence level of 90%.

At least one user action characteristic and/or associated confidence level outputted by at least one of the models is received by the event interpreter 380. The event interpreter is configured to determine, based at least in part on the received at least one user action characteristic, a user action (determined user action) which corresponds to the received at least one user action characteristic and/or associated confidence level. For example, if one model indicates that a "tap" user action characteristic has occurred with a high probability, and another model indicates that the index finger of the user has moved with a high probability, the event interpreter concludes that an "index finger tap" user action has taken place.

The event interpreter comprises a list and/or set of user action characteristics and respective confidence levels. A user action characteristic is determined when a probability matching at least the required confidence level has been received from a model. In the event of a conflict, for example the user action characteristic with the highest indicated probability may be selected by the event interpreter (ArgMax function). The event interpreter 380 may comprise, for example, at least one of the following: a rule-based system, an inference engine, a knowledge base, a lookup table, a prediction algorithm, a decision tree, a heuristic. For example, the event interpreter may comprise an inference engine and a knowledge base. The inference engine outputs probability sets. These sets are handled by the event interpreter which may comprise IF-THEN statements. For example, IF a user action characteristic refers to a certain finger THEN that finger is a part of the user action. The event interpreter may also incorporate and/or utilize contextual information, for example contextual information 308, from another apparatus or application thereof (such as a game or menu state). Using this type of interpreter has the benefit high determinism, as the input, for example, user interface commands, provided to the application is not based solely on wrist sensor inferences. Contextual information is useful in XR technologies such as gaze tracking, where it may be important to have access to the user's status relative to the controllable apparatus.

The event interpreter 380 may be configured to receive optional contextual information 308. Such information may comprise the application state, context, and/or the game state of an application and/or a device being interacted with. Contextual information 308 may be used by the event interpreter to adjust the probability threshold of a user action or a user action characteristic. For example, if an application prompts the user to "pinch" to confirm, the corresponding "pinch" threshold may be lowered so that a pinch action will be detected even if the models output a lower confidence level of such an action occurring. Such an adjustment may be associated with a certain application state, context, and/or the game state of an application and/or a device being interacted with. The application state corresponds to the status of an application running on a controllable apparatus, and may comprise, for example, at least one of: variables, static variables, objects, registers, open file descriptors, open network sockets, and/or kernel buffers.

The at least one user action outputted by the event interpreter 380 is received by the output generator 390. The output generator 390 comprises mapping information comprising at least one of: a list and/or set of predetermined user actions, and a list and/or set of user interface commands, a set of classified gestures, and/or relation information linking at least one predetermined user action with at least one user interface command. Such a link may be 1:1, many to one, one to many, or many to many. Thus, the predetermined action "thumbs up" may be linked to the user interface command "enter", for example. In another example, predetermined actions "tap" and "double tap" may be linked to the user interface command "escape". The output generator 390 is configured to map the user action to the predetermined user interface action and generate, based at least in part on the received user action, a user interface command 307. Said mapping is done using the mapping information. The controller 302 may be configured to transmit user interface command 307 to an apparatus, and/or to store user interface command 307 into the memory of controller 302.

An example of the operation of the apparatus 300 is as follows: A user is using apparatus 300 on his hand. Said user performs an action, the action comprising: abducting his wrist, and, using his middle finger, tapping his thumb two times in succession. The sensors of apparatus 300 provide data during the action as follows:

The IMU sensor 303 provides a data stream 313 reflecting the orientation of the IMU (and thereby the apparatus 300) and acceleration data.

The wrist contour sensor 304 provides a data stream 314 reflecting the movements of the user's tendons and/or muscles within the wrist region.

The bioacoustics sensor 305 provides a data stream 315 reflecting vibrations within the user's wrist region.

The data streams 313, 314, and 315 are received by models 330, 350 and 370 respectively. In model 330, the IMU sensor data is used by the model, and a user action characteristic "wrist abduction" with a confidence level of 68% is provided to event interpreter 380. In model 304, the wrist contour data is used by the model, and two user action characteristics "middle finger movement" with confidence levels of 61% and 82% respectively, are provided to event interpreter 380. In model 305, the bioacoustics data is used by the model and two user action characteristics "tap" with confidence levels of 91% and 77% respectively, are provided to event interpreter 380.

Event interpreter 380 therefore receives the following user action characteristics: "wrist abduction", "middle finger movement" (twice) and "tap" (twice) and the associated confidence levels. The event interpreter determines that the thresholds for the user action characteristics have been met, optionally utilizing contextual data 308, for example by adjusting a threshold based on the data 308, in the process. Thus, event interpreter 380, based on the IF-THEN rules within the event interpreter, generates user actions of "abducted wrist" and "double tap with middle finger". These user actions are received by the output generator 390. Using the mapping information, the output generator determines which user actions are linked to which commands, and generates the appropriate user interface commands. In this example, "wrist abduction" is mapped to "shift" and "double tap with middle finger" is mapped to "double click". Output generator 390 thus generates a user interface command 307 comprising "shift"+"double click", which is then transmitted to an apparatus such as a personal computer. In this example, the personal computer receives a standard user interface command, instead of any sensor data or user actions, which allows the apparatus 300 to be used without preprogramming the personal computer.

In FIG. 3B, an exemplary schematic view of apparatus 400 is shown. Apparatus 400 is similar to apparatus 300, except that apparatus 400 directs the data streams 413, 414 and 415 to one model 435. Model 435 may comprise at least one neural network, similar to models 330, 350, 370. Such a model is configured to perform inference on the input data, for example the signals received from the sensors and/or preprocessed data. The model is configured to output at least one determined user action characteristic and/or an associated confidence level, based on the input data. A benefit of using a single model is that less memory storage is needed.

Figure 4A:
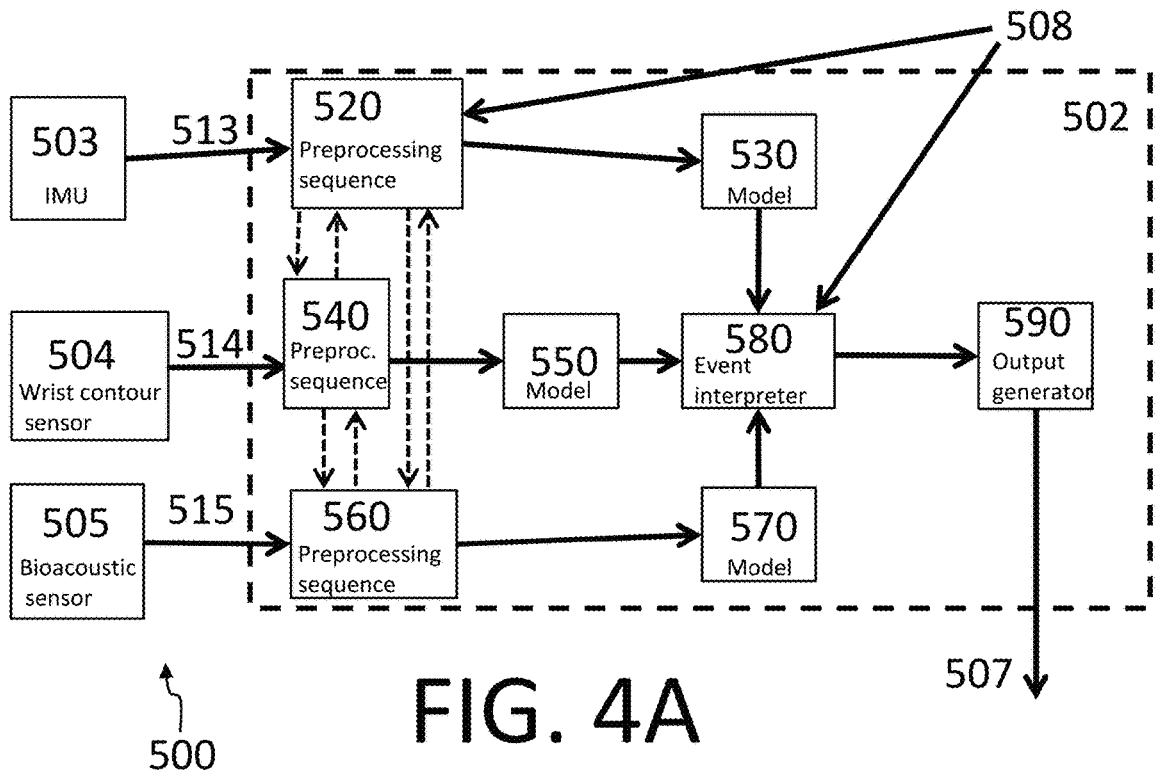
FIGS. 4A and 4B illustrate schematic views of an example apparatus 500 and an example apparatus 600, respectively, said apparatus being capable of supporting at least some of the embodiments of the present invention.
Figure 4B:
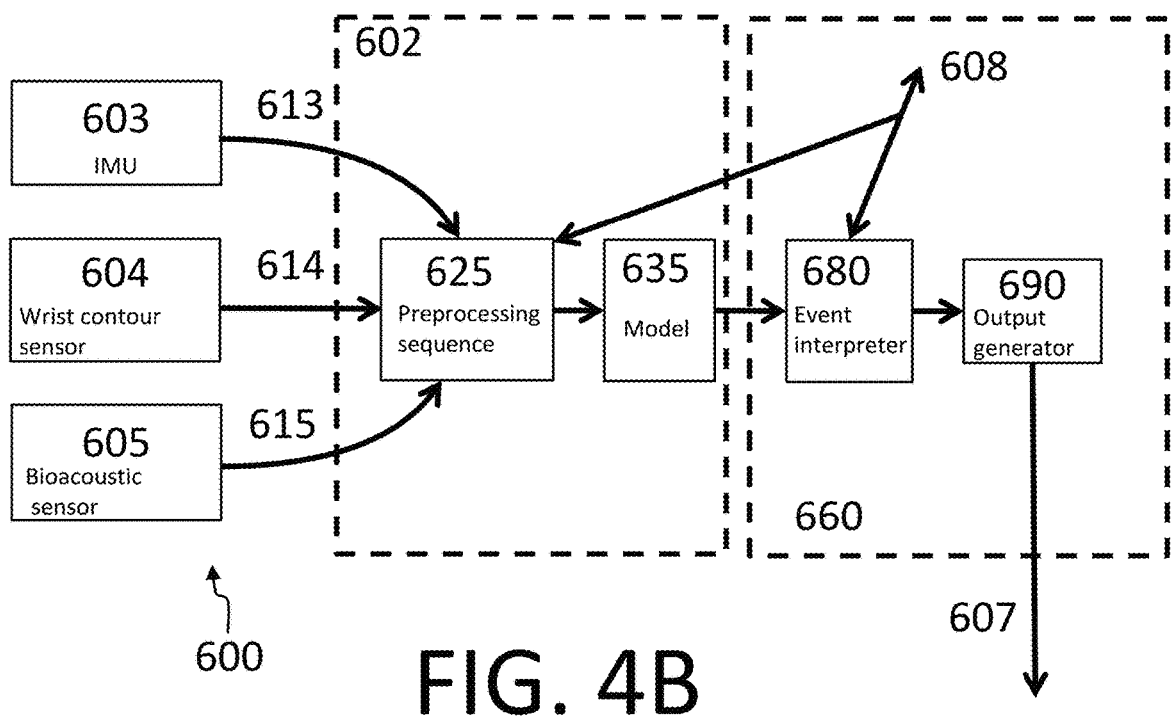

FIGS. 4A and 4B illustrate apparatuses 500 and 600 capable of supporting at least some embodiments of the present invention. Said apparatuses are identical to apparatuses 100, 200, 300 and 400, except when stated otherwise.

In FIG. 4A, an exemplary schematic view of apparatus 500 is shown. As shown in the figure, controller 502 may comprise, for example in the memory of the controller, preprocessing sequences 520, 540 and 560. Preprocessing sequences 520, 540 and 560 are configured to receive signals from the sensors, for example the signals 513, 514 and 515. Preprocessing sequences 520, 540 and 560 are configured to perform preprocessing on the received signals, and send the preprocessed signals to the model(s). Preprocessed signals may be referred to as prepared data or prepared signals. Preprocessing may comprise, for example, at least one of: data cleansing, feature transformation, feature engineering, and feature selection.

Preprocessing sequences 520, 540 and 560 may be configured to communicate with one another, for example to implement sensor fusion as described previously herein. Said optional communication is shown by the dotted arrows connecting the sequences in FIG. 4A, and may comprise adjusting the preprocessing parameters of a sequence based on information within another sequence. Said information may be, for example, at least one of: parameter values, sampling values and/or signal values. Further, preprocessing parameters may be adjusted based on contextual information such as contextual information 508. For example, depending on the application state, the sampling rate of the sensor data may be adjusted. In another example, if the IMU data is indicating a lack of motion, the sampling range of the wrist contour may be decreased so that precise movements are detected better. At least one sequence may be configured to communicate data to another sequence, and at least one sequence may be configured to receive data from another sequence. For example, if a sequence comprises a filter, data from another sequence may be used to adjust the filter parameters. In another example, if the IMU is showing that the apparatus is worn loosely by the user, then this information can be used to adjust the wrist contour sensor pre-processing sequence. A benefit of the preprocessing sequence communication is that the inputs to the models will be more accurate because of better filter characteristics, leading to improved accuracy. Further, the communication allows better adaptation to the user biology and movements, again due to the better filter characteristics and cross-referencing possibilities between the sensors. Also better adaptation is obtained regarding anthropometric variation between users as well as motion artifacts.

In FIG. 4B, an exemplary schematic view of apparatus 600 is shown. Apparatus 600 comprises controller 602 and controllable apparatus 660. In apparatus 600, the preprocessing of signals 613, 614 and 615 is done within controller 602 in sequence 625. In apparatus 600, the preprocessed data output by sequence 625 is used by model 635 within controller 602. Sequence 625 is configured to function in a similar manner as sequences 520, 540 and 560. Further, in sequence 625, data may be combined after preprocessing, for example using subsampling, quantization, complimentary filters, and/or Kalman filters. Model 635 is similar to model 435. Sequence 625 and/or event interpreter 680 may be configured to use optional contextual data 608. Data 608 is similar to data 308, 408, and 508. The contextual data 608 is also bidirectional, that is to say the data may be altered based on at least one of: the application state of apparatus 660, the data of preprocessing state 625, and/or the data of event interpreter 680. Apparatus 600 is configured so that the event interpretation and UI command generation is done within apparatus 660.

In at least some embodiments, an apparatus similar to apparatuses 300, 400, 500, 600 may be arranged so that a single model, similar to models 435, 635, is used with a plurality of preprocessing sequences similar to 520, 540, 560, including the communication between sequences, for example. In at least some embodiments, an apparatus similar to apparatuses 300, 400, 500, 600 may be arranged so that a single preprocessing sequence, similar to sequence 625, may be used with a plurality of models, similar to models 330, 350, 370, for example.

Figure 5:
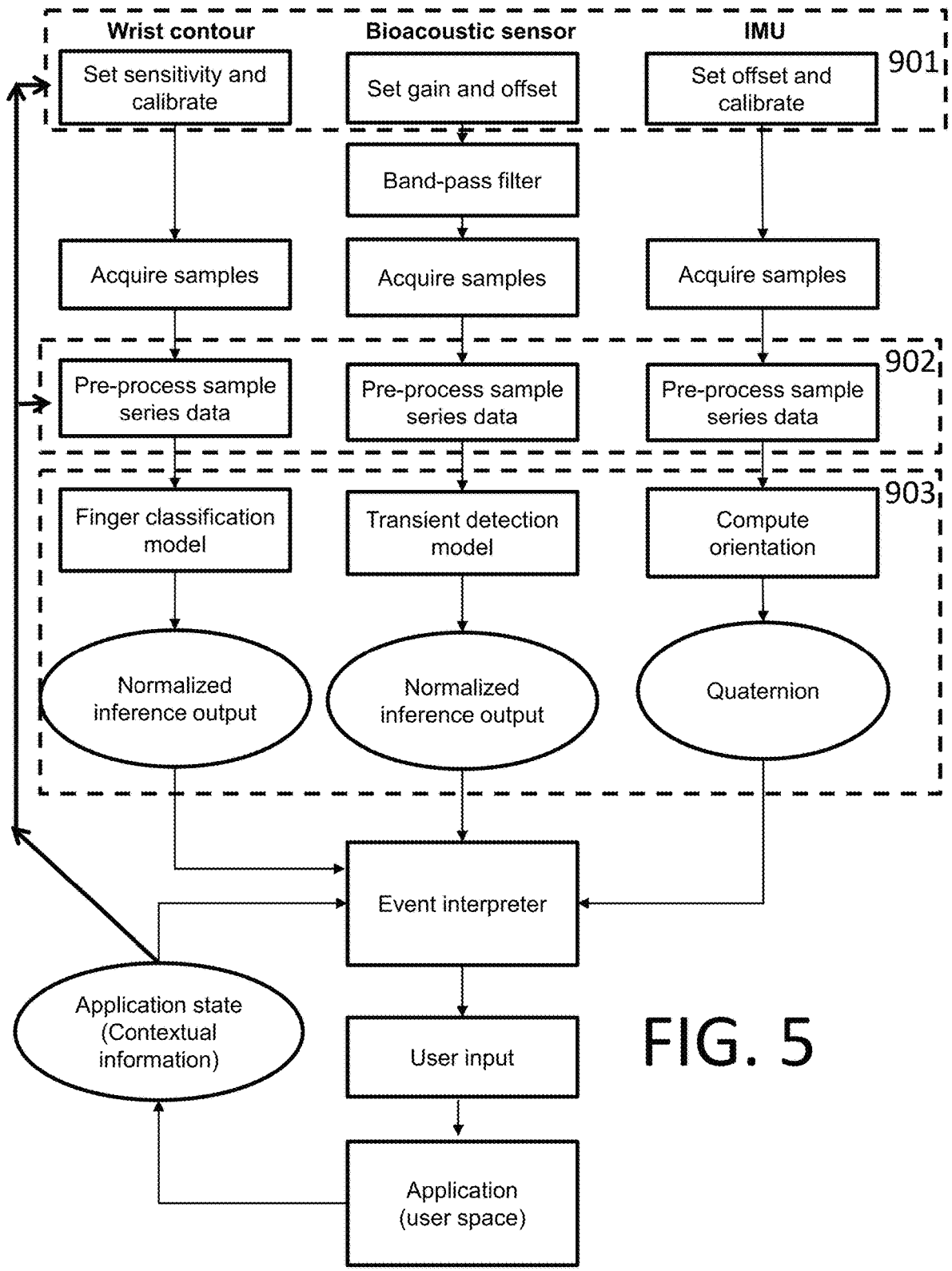
FIG. 5 is a flow graph illustrating an exemplary process capable of supporting at least some of the embodiments of the present invention.

FIG. 5 illustrates in flowchart form an exemplary process capable of supporting at least some embodiments of the present invention. At the top of FIG. 5, the wrist contour sensor (similar to sensors 104, 304, 404, 504, 604, for example), the bioacoustic sensor (similar to sensors 105, 305, 405, 505, 605, for example, and the IMU (similar to 103, 303, 403, 503, 603, for example) are shown. The actions and steps of the flowchart may be performed in least in part by an apparatus, for example an apparatus disclosed herein such as a controller. At least some actions, such as providing contextual information, may be performed by a second apparatus, such as a controllable system, for example.

The flowchart of FIG. 5 comprises illustrative but non-limiting steps 901, 902, 903. Said steps are only provided to illustrate how the flowchart represents a similar process as shown in FIGS. 3A, 3B and 4A, 4B. As shown in FIG. 5, actions need not necessarily be within a step. Further, the actions within steps 901, 902, 903 need not be performed concurrently.

Step 901 comprises adjustment of the sensors. Such adjustment may be self-referential, e.g. the sensor is adjusted or calibrated according to a stored reference value or a known good (e.g. magnetic north for the IMU). Additionally or alternatively, the adjustment may be contextual, wherein the gain of a bioacoustic sensor is adjusted according to ambient sound levels.

For the bioacoustics sensor, as seen in the flowchart, a band-pass filter may be optionally implemented. Such a filter may be useful for reducing the bandwidth to only the region where activity of interest occurs. This reduced bandwidth improves the signal to noise ratio and decreases the size of the data payload to subsequent processing steps.

As seen in the flowchart, after samples (sensor data) are acquired, the acquired sensor data is preprocessed. Step 902 comprises the preprocessing and corresponds to blocks 520, 540 and 560 of FIG. 4A and block 625 of FIG. 4B.

As seen in the flowchart, after the preprocessing, the preprocessed data is input into models in step 903. While in the flowchart, each sensor has its own model (similar to FIGS. 3A and 4A), a solution with a single model (as in FIGS. 3B and 4B) is also usable. The models in the flowchart are similar to models 330, 530, 350, 550, 370, 570. In the flowchart, the preprocessed IMU data is used to calculate the orientation IMU (and thereby of the user's hand) directly, for example without a neural network. Such a calculation corresponds to the above-mentioned discussion of quaternions, for example.

Further in step 903, the models output the normalized inference output corresponding to a user action characteristic. "Normalized", in this context, means that the sum of the confidence values for a given inference adds up to 1. In the case of the IMU data, the output is a quaternion reflecting the orientation of the IMU sensor. The output data corresponding to the user action characteristic is provided to the event interpreter, which is similar to interpreters 380, 480, 580, 680.

Optional contextual information reflecting the application state may be provided as well to the event interpreter. The contextual information is similar to information 308, 408, 508, 608. As can be seen in the flowchart, said contextual information may be alternatively or additionally also provided to at least one of steps 901 and/or 902, wherein the providing is optional and may comprise providing to only some of the adjustment blocks and/or preprocessing blocks, for example to at least one of the adjustment blocks and/or preprocessing blocks.

The event interpreter determines the user input, which is then provided to the application being controlled, for example in a format corresponding to that of UI commands 307, 407, 507, 607. Said application may be run in another apparatus or networked device.

Figure 6:
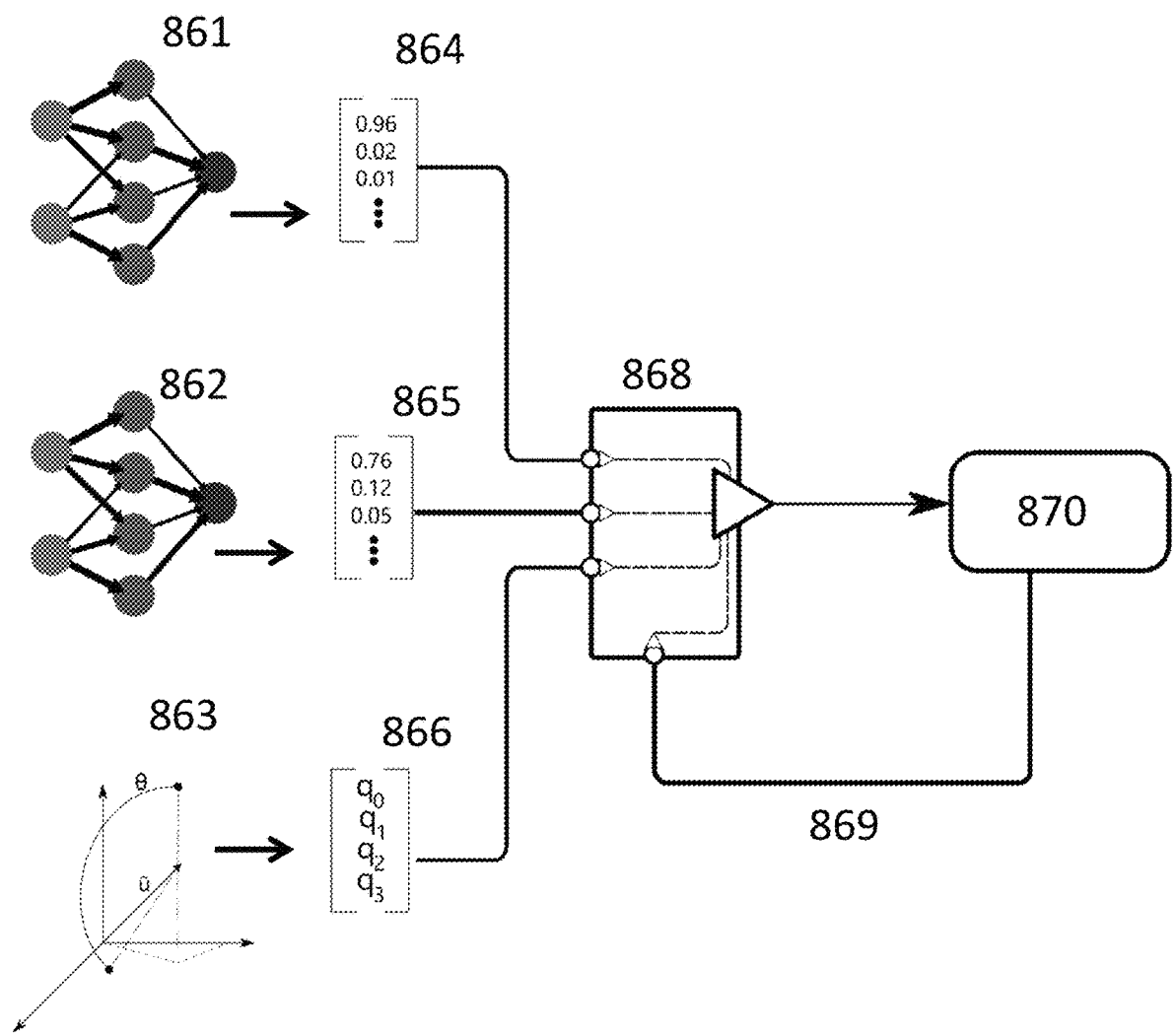
FIG. 6 is a flow graph illustrating an exemplary process capable of supporting at least some of the embodiments of the present invention.

FIG. 6 depicts a simplified flowchart reflecting at least some of the embodiments disclosed herein. In the figure, artificial neural networks (ANN) 861 and 862 are shown in a simplified graphical representation. For example, models 330, 530, 350, 550, 370, 570 may comprise such neural networks. Such models may be configured to output confidence ranges in vector form, as shown in the figure (vectors 864, 865). Such a vector may comprise a 1×n vector, populated with the probability values of each user action characteristic known to the controller. For example, model 861 may comprise a finger classifier model. For example, model 862 may comprise a transient detector model.

As seen in the figure, for IMU data a quaternion may be calculated within a model (as graphically represented by element 864) and quaternion orientation data (866) may be output by the model.

As seen in FIG. 6, the outputs 864, 865 and 866 are provided to event interpreter 868, shown here as a simplified block. Event interpreter 868 may be similar to interpreters 380, 480, 580, 680. Event interpreter 868 may be optionally configured to receive, from controllable application 870, contextual information 869. The contextual information 869 is similar to information 308, 408, 508, 608. Controllable application 870 may comprise a user space.

Figure 7:
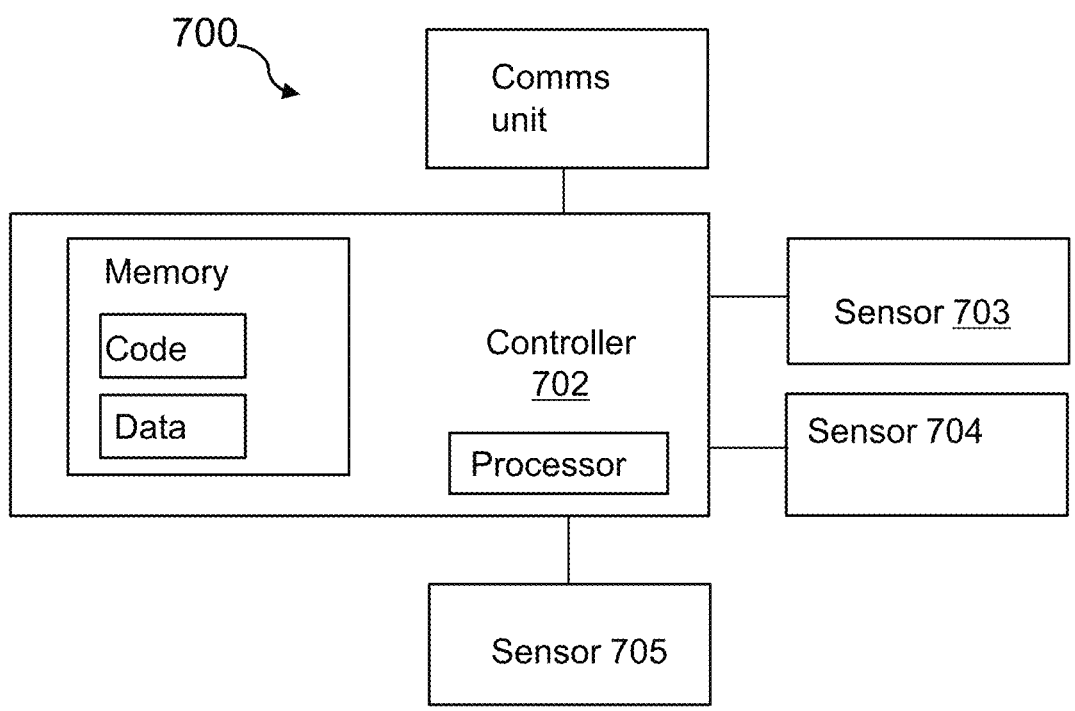
FIG. 7 illustrates a schematic view of an example apparatus 700 capable of supporting at least some of the embodiments of the present invention.

FIG. 7 illustrates an apparatus 700 capable of supporting at least some of the embodiments of the invention.

The apparatus 700 comprises a controller 702. The controller comprises at least one processor, and at least one memory including computer program code, and optionally data. The apparatus 700 may further comprise a communication unit or interface. Such a unit may comprise, for example, a wireless and/or wired transceiver. The apparatus 700 may further comprise sensors such as sensor 703, 704, 705, which are operatively connected to the controller. Said sensors may comprise, for example, at least one of an IMU, a bioacoustic sensor, a wrist contour sensor. The apparatus 700 may also include other elements not shown in FIG. 7.

Although the apparatus 700 is depicted as including one processor, the apparatus 700 may include more processors. In an embodiment, the memory is capable of storing instructions, such as at least one of: operating system, various applications, models, neural networks and/or, preprocessing sequences. Furthermore, the memory may include a storage that may be used to store, e.g., at least some of the information and data used in the disclosed embodiments.

Furthermore, the processor is capable of executing the stored instructions. In an embodiment, the processor may be embodied as a multi-core processor, a single core processor, or a combination of one or more multi-core processors and one or more single core processors. For example, the processor may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor may be configured to execute hard-coded functionality. In an embodiment, the processor is embodied as an executor of software instructions, wherein the instructions may specifically configure the processor to perform at least one of the models, sequences, algorithms and/or operations described herein when the instructions are executed.

The memory may be embodied as one or more volatile memory devices, one or more non-volatile memory devices, and/or a combination of one or more volatile memory devices and non-volatile memory devices. For example, the memory may be embodied as semiconductor memories (such as mask ROM, PROM (programmable ROM), EPROM (erasable PROM), flash ROM, RAM (random access memory), etc.).

The at least one memory and the computer program code may be configured to, with the at least one processor, cause the apparatus 700 to at least perform as follows: receive a first sensor data stream from the at least one wrist contour sensor, receive a second sensor data stream from the at least one bioacoustic sensor, receive a third sensor data stream from the at least one inertial measurement unit, wherein the first, the second and the third sensor data stream are received concurrently, and determine, based on at least one of the first, the second and the third sensor data stream, at least one characteristic of an user action, determine, based on the determined at least one characteristic of an user action, at least one user action, and generate at least one user interface, UI, command, based at least in part on the determined at least one user action. These actions are discussed above in more detail in connection with FIGS. 1 to 6.

In at least some embodiments, apparatuses capable of supporting the invention are configured so that the sensors of the apparatus are within a single housing. Examples of such single-housing apparatuses are provided below. Arranging the sensors, for example the IMU 853, the wrist contour sensor 854, and the bioacoustics sensor 855 within a single housing results in a robust construction.

Figure 8A:
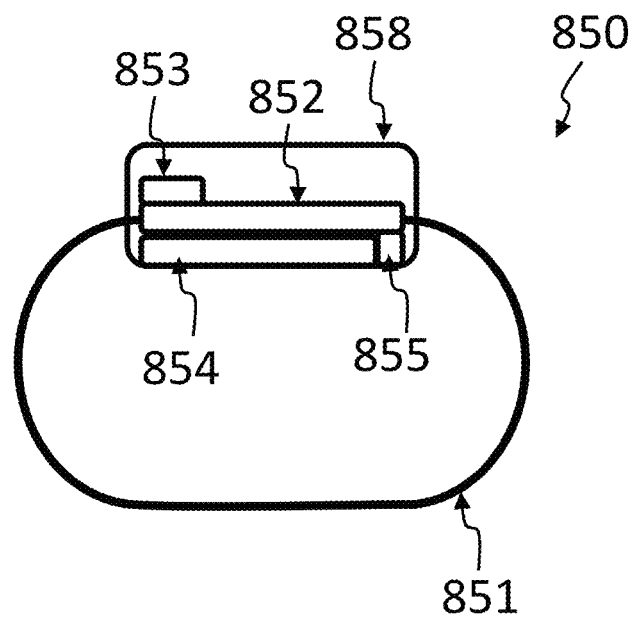
FIGS. 8A and 8B illustrate schematic views of an example apparatus 850 capable of supporting at least some of the embodiments of the present invention.
Figure 8B:
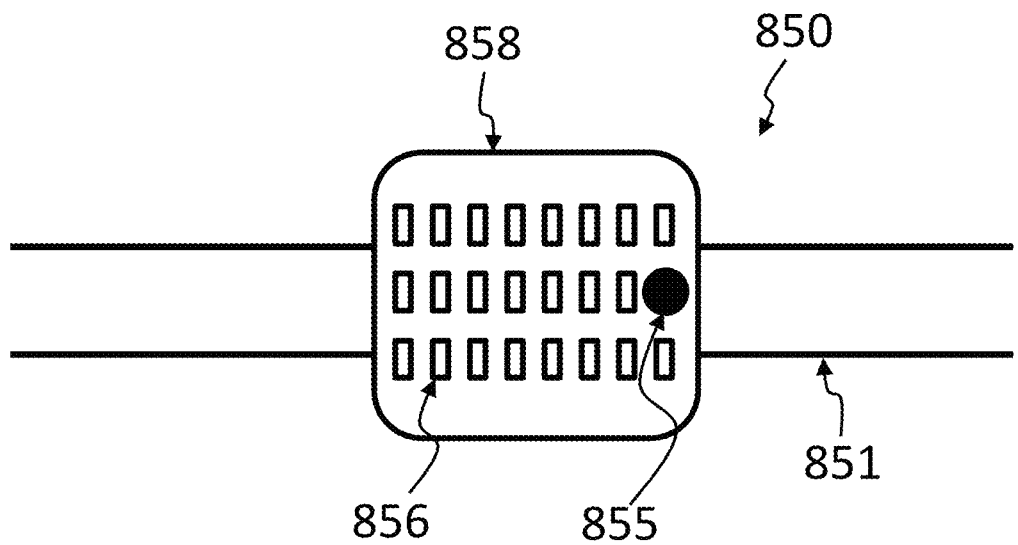

FIGS. 8A and 8B illustrate apparatus 850 capable of supporting at least some embodiments of the present invention. Apparatus 850 may be identical to apparatuses 100, 200, 300, 400, 500, 600 and/or 700.

FIG. 8A shows a side view of apparatus 850. Apparatus 850 comprises: controller 852, IMU 853, wrist contour sensor 854, and/or bioacoustic sensor 855. Wrist contour sensor 854 may comprise one or more profilometric sensors 856, for example arranged in an array. In an embodiment apparatus 850 comprises the sensors 853, 854 and 855 within a single housing 858. As can be seen from FIG. 8A the sensors 854 and 855 are situated within the housing in such a manner that they may measure signals from outside the housing, for example the sensors may be arranged in connection with ports of the housing or close to the surface of the housing. In other words, signals measured by the wrist contour sensor 854 and the bioacoustic sensor 855 originate outside the housing. In at least some embodiments, apparatus 850 may comprise mounting component 801, which may be a strap, for example. In at least some embodiments, apparatus 850 may comprise a smartwatch. In at least some embodiments, apparatus 850 may comprise at least one of the following components, for example: a haptic device, a screen, a touchscreen, a speaker, a heart rate sensor, a Bluetooth communications device.

FIG. 8B shows a bottom view of apparatus 850. Wrist contour sensor 854 comprises an array of profilometric sensors 856 which can be seen on the surface of the housing 858. Said surface may be concave in shape. Said array may be configured to detect wrist contour measurements of a user when the user is wearing device 850. Bioacoustic sensor 855 is also seen on the surface of housing 858. Sensor 855 may be configured to measure bioacoustic signals related to the user when the user is wearing device 850. Apparatus 850 may be configured to concurrently obtain signals from sensors 853, 854 and 855.

Figure 9:
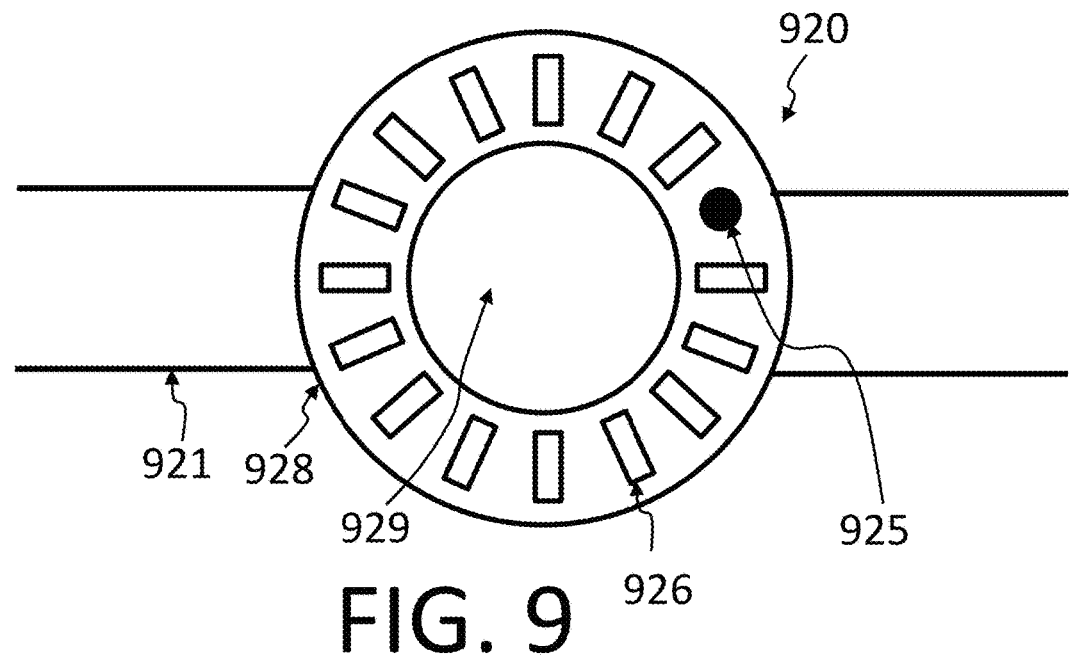
FIG. 9 illustrates a schematic view of an example apparatus 920 capable of supporting at least some of the embodiments of the present invention.

FIG. 9 illustrates apparatus 920 capable of supporting at least some embodiments of the present invention. Apparatus 920 may be identical to apparatuses 100, 200, 300, 400, 500, 600, and/or 700.

FIG. 9 shows an isometric bottom view of apparatus 920. Apparatus 920 comprises within housing 928: a controller, an IMU, a wrist contour sensor comprising profilometric sensors 926, and/or a bioacoustic sensor 925. An array of profilometric sensors 926 can be seen on the surface of the housing 928. Said surface may be concave in shape. Said array may be configured to detect wrist contour measurements of a user when the user is wearing device 920. Bioacoustic sensor 925 is also seen on the surface of housing 928. Sensor 925 may be configured to measure bioacoustic signals related to the user when the user is wearing device 920.

As can be seen from FIG. 9, said array of sensors 926 and bioacoustic sensor 925 are arranged in an annular configuration on the surface of housing 928. Such a configuration allows arranging other components, for example sensors, within the center area 929 of housing 928. In other words, arranging the array of sensors 926 and the sensor 925 to follow the periphery of housing 928 for example in a circular and/or rectangular configuration makes it easier to accommodate other sensors on the same surface of housing 928, as said other sensors can be arranged in the remaining space. Further, the other sensors can be configured so that there is spacing between them and the profilometric sensors, whereby any potential interference will be minimized. For example, a heart rate sensor could be conveniently located in the center area 929. Such a location minimizes possible interference, for example optical interference, from the profilometric sensors.

Apparatus 920 may be configured to concurrently obtain signals from the IMU and from sensors 925 and 926. In at least some embodiments, apparatus 920 may comprise a smartwatch. In at least some embodiments, apparatus 920 may comprise at least one of the following components, for example: a haptic device, a screen, a touchscreen, a speaker, a heart rate sensor, a Bluetooth communications device.

Figures 10A, 10B:
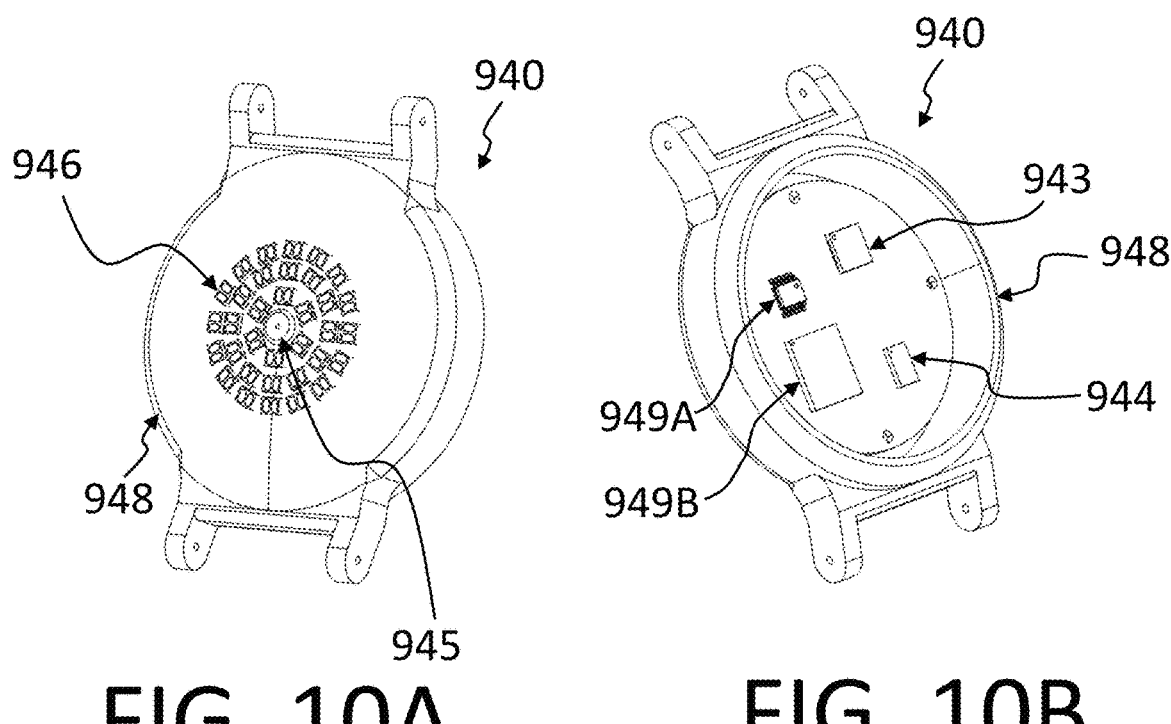
FIGS. 10A and 10B illustrate schematic views of an example apparatus 940 capable of supporting at least some of the embodiments of the present invention.

FIGS. 10A and 10B illustrate apparatus 940 capable of supporting at least some embodiments of the present invention. FIG. 10A shows a bottom view of apparatus 940. FIG. 10B shows an isometric cutaway top view of apparatus 940. Apparatus 940 comprises: a controller, IMU 943, wrist contour sensor 944, and/or bioacoustic sensor 945. Wrist contour sensor 944 may comprise or be connected to one or more profilometric sensors 946, for example arranged in an array of concentric rings as seen in FIG. 10A. The array may comprise from 1 ring to up to 24 rings, preferably from 3 to 6 rings, in particular 3 rings. The number of rings may depend on the form factor of the apparatus. In this context, rings refers to any geometric arrangement of at least one sensor spaced along an open or shut curve, for example. For example, loops including circular or rectangular rings, oval rings, lines or an X-shape are suitable. For example, a innermost loop may comprise 6 sensors spaced along the loop, a second loop may comprise 12 sensors spaced along said loop, and an outermost loop may comprise 16 sensors spaced along said loop. The loops may be in circular, rectangular or other forms. Apparatus 940 comprises sensors 943, 944 and 945 within a single housing 948. The sensors 946, 945 are arranged on the surface of the housing to measure signals originating outside the housing. Said surface may be concave in shape. In at least some embodiments, apparatus 940 may comprise a smartwatch. In at least some embodiments, apparatus 940 may comprise at least one of the following components, for example: a haptic actuator, a screen, a touchscreen, a speaker, a heart rate sensor, a Bluetooth communications device.

FIG. 10B shows an isometric cutaway top view of apparatus 940. In the view, components such as: the screen and/or top casing and/or the bezel have been removed to render the interior of housing 948 visible. Within housing 948 a circuit board is mounted. On said circuit board components may be mounted, such as: IMU 943, processor 949A and memory 949B. Together, said processor and said memory may comprise the controller of apparatus 940. Sensors including sensors 943, 944 946 and 945 may be directly or indirectly connected to processor 949A and/or memory 949B so as to provide sensor data to the controller.

Figure 11:
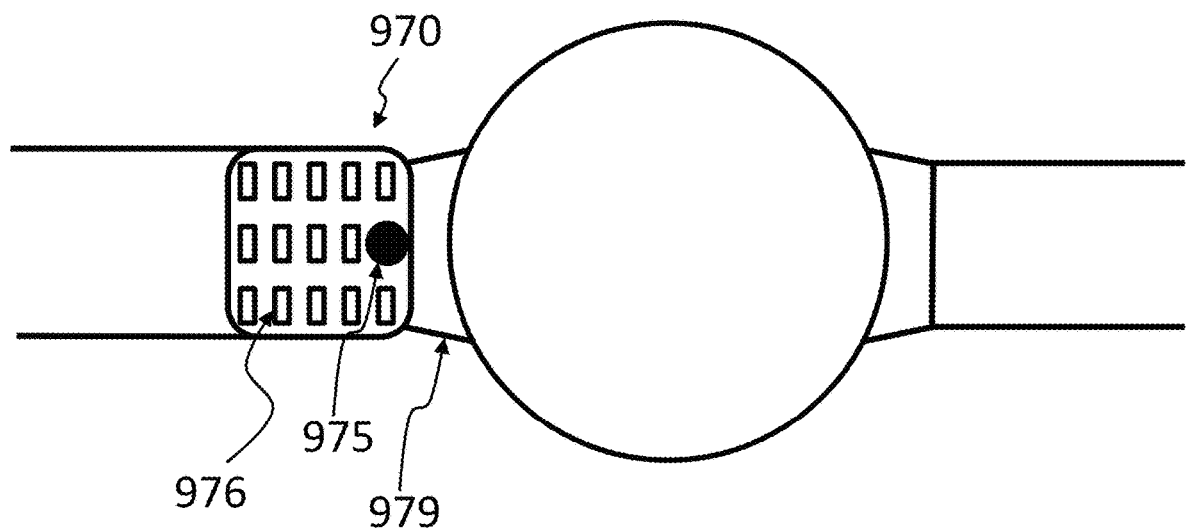
FIG. 11 illustrates a schematic view of an example apparatus 970 capable of supporting at least some of the embodiments of the present invention.
Figure 12:
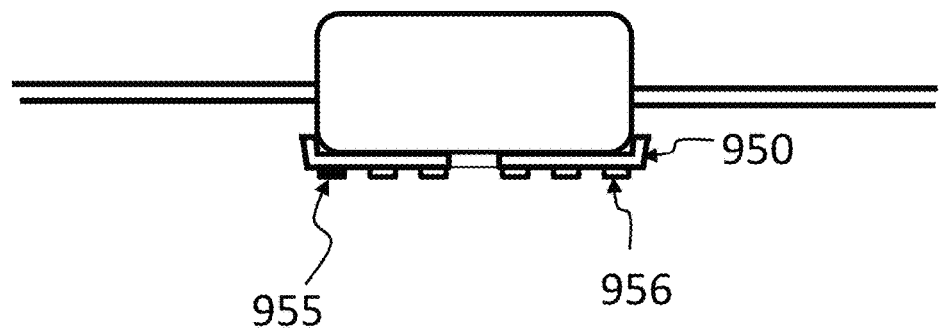
FIG. 12 illustrates a schematic view of an example apparatus 950 capable of supporting at least some of the embodiments of the present invention.

FIG. 11 illustrates apparatus 970 capable of supporting at least some embodiments of the present invention. FIG. 11 shows a bottom view of apparatus 970. Apparatus 970 is attachable to a wearable device, for example a smartwatch. Apparatus 970 is thus an example of an add-on apparatus. An add-on apparatus is designed to be used alone or in combination with another apparatus and/or in combination with a mounting component. An add-on apparatus may not include a mounting component and/or a screen in at least some embodiments. Add-on apparatuses may communicate with other devices, such as wearables, wirelessly or via ports. Add-on apparatuses may be used with other wearable devices in at least the following ways:

The add-on apparatus may be directly attached to the body of another wearable so that the add-on apparatus may measure signals related to a user or gestures of the user, for example as seen in FIG. 12;

The add-on apparatus may be attached to a mounting component of another wearable, wherein the mounting component is a strap, for example the same strap as another wearable, or a bracelet in case of an activity bracelet, for example;

The add-on apparatus may be part of or connected to a mounting component such as a strap, for example in a manner such that the add-on apparatus is connected on one side to the other wearable and to the strap on the other side as seen in FIG. 11.

Apparatus 970 comprises within a single housing: a controller, an IMU, a wrist contour sensor, and/or a bioacoustic sensor 975. The wrist contour sensor may comprise an array of profilometric sensors, for example sensors 976 which are arranged on the surface of the housing. Said surface may be concave in shape. Said array may be configured to detect wrist contour measurements of a user when the user is wearing device 970. Bioacoustic sensor 975 is also arranged on the surface of the housing. The wrist contour sensor may be configured to measure bioacoustic signals related to the user when the user is wearing apparatus 970. As can be seen in the FIG. 11, the measurement area corresponding to the sensors may differ depending on the embodiment of the disclosure. For example, in FIG. 9 the measurement area is typically on the center portion of a user's wrist, while in the embodiment of FIG. 11 it will be more to the side of said wrist.

As can be seen in the figure, apparatus 970 is connected to a mounting component, for example a strap, on the left edge of the apparatus and to a wearable device on the right edge of the apparatus. The connection to the mounting component may be done via any suitable means, for example: mounting brackets and/or adhesive. The connection to the wearable may be done using e.g. pins 979 which fit the wearable device, for example watch pins. As can be seen from FIG. 11, the sensors 975 and 976 are situated on the surface of the housing so that they may measure signals from outside the housing.

In an exemplary embodiment, the sensors 975 and 976 are arranged in an annular pattern similar to the pattern of apparatus 920, or that of apparatus 940. In another exemplary embodiment and as seen in FIG. 11, the sensors may be arranged in orthogonal rows similar to the pattern of apparatus 850. Apparatus 970 may be configured to concurrently obtain signals from the IMU and from sensors 975 and 976. Apparatus 970 may be configured to transmit data, for example user actions and/or user interface frames, wirelessly, for example using Bluetooth, to another device. The recipient of such a data transmission may include at least one of: the attached wearable device, any wearable device, a smartphone.

FIG. 12 illustrates apparatus 950 capable of supporting at least some embodiments of the present invention. FIG. 12 shows a side view of apparatus 950. Apparatus 950 is attachable to a wearable device, for example a smartwatch. Apparatus 950 is thus an example of an add-on apparatus. Apparatus 950 may be attached to a wearable device by any suitable means, for example by at least one of: mechanical friction such as snap-fit (press-fit) and/or screwing, adhesive, magnetic connection, fitting via thermal expansion.

Apparatus 950 comprises within housing 958: a controller, an IMU, a wrist contour sensor, and/or a bioacoustic sensor 955. An array of profilometric sensors 956 can be seen on the surface of the housing 958. Said surface may be concave in shape. Said array may be configured to detect wrist contour measurements of a user when the user is wearing device 950. Bioacoustic sensor 955 is also seen on the surface of housing 958. Sensor 955 may be configured to measure bioacoustic signals related to the user when the user is wearing device 950.

As can be seen from FIG. 12, the sensors 955 and 956 are situated on the surface of the housing so that they may measure signals from outside the housing. In an exemplary embodiment, the sensors 955 and 956 are arranged in an annular pattern similar to the pattern of apparatus 920, or that of apparatus 940. In another exemplary embodiment, the sensors may be arranged in orthogonal rows similar to the pattern of apparatus 850. Apparatus 950 may be configured to concurrently obtain signals from the IMU and from sensors 955 and 956. Apparatus 950 may be configured to transmit data, for example user actions and/or user interface frames, wirelessly, for example using Bluetooth, to another device. The recipient of such a data transmission may include at least one of: the attached wearable device, any wearable device, a smartphone.

The present disclosure can also be utilized via the following clauses.

Clause 1. A non-transitory computer readable medium having stored thereon a set of computer readable instructions that, when executed by at least one processor, cause an apparatus to at least:
measure, using at least one wrist contour sensor, at least one bioacoustic sensor comprising a vibration sensor, and at least one movement sensor such as an IMU, concurrent signals corresponding to at least one movement of an user,
receive the measured concurrent signals in a controller comprising at least one processor and at least one memory including computer program code,
combine, by the controller, the received concurrent signals, and
generate, by the controller, a human interface data, HID, data frame based at least in part on characteristics of the combination of the received signals.

Clause 2. A multimodal biometric measurement apparatus, the apparatus comprising:
a strap,
at least one wrist contour sensor,
at least one bioacoustic sensor comprising a vibration sensor,
at least one movement sensor, and
a controller comprising at least one processor and at least one memory including computer program code, the at least one memory and the computer program code configured to with the at least one processor, to cause the controller at least to:
receive concurrent signals from the wrist contour sensor, the bioacoustics sensor and the movement sensor,
combine the received signals,
generate a human interface data, HID, data frame based at least in part on characteristics of the combination of the received signals.

Clause 3. The apparatus of clause 2, wherein the at least one wrist contour sensor, the at least one bioacoustic sensor, and the at least one movement sensor are arranged within a single housing.

Clause 4. The apparatus of clause 2 or 3, wherein the apparatus comprises a smartwatch.

Clause 5. The apparatus of any of clauses 2-4, wherein the wrist contour sensor comprises an array of profilometric sensors and wherein said array is arranged with the at least one bioacoustic sensor in an annular form on the surface of the single housing, wherein the surface is preferably concave in shape.

Clause 6. The apparatus of any of clauses 2-5, wherein the wrist contour sensor comprises an array of profilometric sensors comprising concentric rings on the surface of the single housing, wherein the array comprises between 1 and 25 rings, preferably 2-6 rings, in particular 3 rings.

Clause 7. The apparatus of any of clauses 2-6, wherein the apparatus comprises an add-on device, wherein the apparatus is configured to be attached to another wearable by at least one of the following arrangements:
wherein the add-on apparatus is configured to be directly attached to the body of another wearable in such a manner that the sensors of the add-on apparatus may measure the user, for example so that the sensors are oriented towards the user;
wherein the add-on apparatus is configured to be attached to a mounting component of another wearable, for example wherein the mounting component is a strap, in particular the same strap as another wearable; and/or
wherein the add-on apparatus is configured to be part of or connected to a mounting component of another wearable, wherein the mounting component is a strap, for example in a manner such that the add-on apparatus is connected on one side to the other wearable and to the strap on the other side.

Clause 8. The apparatus of any of clauses 2-7, wherein the controller is arranged within the single housing.

Clause 9. The method of clause 1 or the apparatus of any of clauses 2-8, wherein the generation comprises determining at least one user action characteristic based on the characteristics of the combination of the received signals, and wherein said determination comprises inputting the received signals into at least one neural network trained to determine said at least one user action characteristic and output a confidence level corresponding to said at least one user action characteristic.

Clause 10. A computer program configured to cause a method in accordance with clause 1 or clause 9 to be performed, where said program is storable on a non-transitory computer readable medium.

Advantages of the present disclosure include the following: Multimodal sensing provides high determinism when sensing user actions, as the sensed actions are determined based on the output of multiple sensors. Further, the apparatus and method is more adaptable to an individual user due to the possibility of configuring each sensor to better account for the user's unique biology and mannerisms.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In this description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in providing a user interface, for example relating to XR, for a controllable apparatus, such as a personal computer.

REFERENCE SIGNS LIST

| | |
|---|---|
| 100, 200, 300, 400, 500, 600, 700, 850, 920, 940, 950, 970 | Apparatus |
| 101, 201, 851, 921 | Mounting component |
| 102, 302, 402, 502, 602, 702, 852 | Controller |
| 103, 303, 403, 503, 603, 703, 853, 943 | Inertial measurement unit (IMU) |
| 104, 304, 404, 504, 604, 704, 854, 944 | Wrist contour sensor |
| 105, 305, 405, 505, 605, 705, 855, 925, 945, 975, 955 | Bioacoustic sensor |
| 106, 856, 926, 946, 976, 956 | Profilometric sensor |
| 294 | Wrist contour |
| 295 | Bioacoustic measurement area |
| 296 | IMU |
| 297 | Wrist contour measurement area |
| 298 | Housing protrusion |

-continued

REFERENCE SIGNS LIST

| | |
|---|---|
| 299 | Hand of a user |
| 307, 407, 507, 607 | UI command |
| 313, 413, 513, 613 | Sensor data stream |
| 314, 414, 514, 614 | Sensor data stream |
| 315, 415, 515, 615 | Sensor data stream |
| 330, 530, 861 | Model |
| 350, 550, 862 | Model |
| 370, 570, 863 | Model |
| 380, 480, 580, 680, 868 | Event interpreter |
| 390, 490, 590, 690 | Output generator |
| 660 | Controllable apparatus |
| 435, 635 | Model |
| 520, 540, 560 | Preprocessing sequence |
| 625 | Preprocessing sequence |
| 308, 408, 508, 608, 869 | Contextual information |
| 858, 928, 948 | Housing |
| 929 | Center area of housing |
| 864, 865 | Confidence level vector |
| 866 | Orientation data (quaternion) |
| 870 | Controllable apparatus |
| 801, 802, 803, 804 | Signals |
| 901, 902, 903 | Steps of method |

The invention claimed is:

1. A multimodal biometric measurement apparatus, the apparatus comprising:
a mounting component configured to be worn by a user,
at least one wrist contour sensor,
at least one bioacoustic sensor comprising a vibration sensor,
at least one inertial measurement unit, IMU, comprising an accelerometer and gyroscope,
wherein the at least one wrist contour sensor, the at least one bioacoustic sensor, and the at least one inertial measurement unit are arranged within a single housing, and
a controller comprising at least one processor and at least one memory including computer program code, the at least one memory and the computer program code configured to with the at least one processor, to cause the controller at least to:
receive a first sensor data stream from the at least one wrist contour sensor,
receive a second sensor data stream from the at least one bioacoustic sensor,
receive a third sensor data stream from the at least one inertial measurement unit,
wherein the first, the second and the third sensor data stream are received concurrently, and
determine, based on at least one of the first, the second and the third sensor data stream, at least one characteristic of a user action,
determine, based on the determined at least one characteristic of a user action, at least one user action, and
generate at least one user interface, UI, command, based at least in part on the determined at least one user action,
wherein at least one of the first, the second or the third sensor data stream is preprocessed in a separate preprocessing sequence from the other data streams.

2. The apparatus of claim 1, wherein determining the at least one characteristic of a user action comprises providing at least one of the first, the second and the third sensor data stream as an input to at least one neural network trained to determine at least one characteristic of a user action as an output, wherein the output of the at least one neural network comprises a confidence value of the at least one characteristic of an user action.

3. The apparatus of claim 2, wherein determining the at least one user action comprises providing the output of the at least one neural network to an event interpreter configured to determine the user action based on the determined user action characteristics and received contextual information.

4. The apparatus of claim 2, wherein the controller is configured to perform preprocessing on at least one of the first, the second and the third sensor data stream before providing the at least one preprocessed data stream as an input to the at least one neural network.

5. The apparatus of claim 4, wherein the controller is configured so that at least one preprocessing sequence communicates with at least one second preprocessing sequence, wherein the communication comprises adjusting, based on data from the at least one preprocessing sequence, the preprocessing parameters of the second preprocessing sequence.

6. The apparatus of claim 1, wherein the controller is further configured so that the first sensor data stream is provided to a first neural network, the second sensor data stream is provided to a second neural network, and the third sensor data stream is provided to a third neural network or mathematical model.

7. The apparatus of claim 1, wherein the apparatus comprises a smartwatch.

8. The apparatus of claim 1, wherein the wrist contour sensor comprises an array of profilometric sensors and wherein said array is arranged with the at least one bioacoustic sensor in an annular form on the surface of the single housing.

9. The apparatus of claim 1, wherein the wrist contour sensor comprises an array of profilometric sensors comprising concentric or rectangular loops on the surface of the single housing, wherein the array comprises 2-6 loops.

10. The apparatus of claim 1, wherein the apparatus comprises an add-on apparatus and wherein the apparatus is configured to be attached to another wearable by at least one of the following arrangements:
  wherein the add-on apparatus is configured to be directly attached to a body of the another wearable in such a manner that the sensors of the add-on apparatus may measure a user;
  wherein the add-on apparatus is configured to be attached to a mounting component of the another wearable; and/or
  wherein the add-on apparatus is configured to be part of the mounting component of the another wearable.

11. A method to generate UI commands, the method comprising:
  receiving a first sensor data stream from at least one wrist contour sensor,
  receiving a second sensor data stream from at least one bioacoustic sensor,
  receiving a third sensor data stream from at least one inertial measurement unit,
  wherein the at least one wrist contour sensor, the at least one bioacoustic sensor, the at least one inertial measurement unit are arranged within a single housing and wherein the first, the second and the third sensor data stream are received concurrently, and
  determining, based on at least one of the first, the second and the third sensor data stream, at least one characteristic of a user action,
  determining, based on the determined at least one characteristic of a user action, at least one user action, and
  generating at least one user interface, UI, command, based at least in part on the determined at least one user action,
  wherein at least one of the first, the second or the third sensor data stream is preprocessed in a separate preprocessing sequence from the other data streams.

12. The method of claim 11, wherein determining the at least one characteristic of a user action comprises providing at least one of the first, the second and the third sensor data stream as an input to at least one neural network trained to determine at least one characteristic of a user action as an output, wherein the output of the at least one neural network comprises a confidence value of the at least one characteristic of a user action.

13. The method of claim 11, wherein determining the at least one user action comprises providing the output of at least one neural network to an event interpreter configured to determine the user action based on the determined user action characteristics.

14. The method of claim 11, wherein preprocessing is performed on at least one of the first, the second and the third sensor data stream before providing the at least one preprocessed data stream as an input to at least one neural network.

15. The method of claim 11, wherein at least one preprocessing sequence communicates with at least one second preprocessing sequence, wherein the communication comprises adjusting the preprocessing parameters of the second preprocessing sequence.

16. The method of claim 11, wherein the single housing comprises a smartwatch.

17. The method of claim 11, wherein the wrist contour sensor comprises an array of profilometric sensors and wherein said array is arranged with the at least one bioacoustic sensor in an annular form on the surface of the single housing.

18. The method of claim 11, wherein the apparatus comprises an add-on apparatus, wherein the apparatus is configured to be attached by at least one of the following arrangements:
  wherein the add-on apparatus is configured to be directly attached to a body of the another wearable in such a manner that the add-on apparatus may measure a user;
  wherein the add-on apparatus is configured to be attached to a mounting component such as a strap; and/or
  wherein the add-on apparatus is configured to be part of a mounting component.

19. A non-transitory computer readable medium having stored thereon a set of computer readable instructions that, when executed by at least one processor, cause an apparatus to at least:
  receive a first sensor data stream from at least one wrist contour sensor,
  receive a second sensor data stream from at least one bioacoustic sensor,
  receive a third sensor data stream from at least one inertial measurement unit, wherein the at least one wrist contour sensor, the at least one bioacoustic sensor, and the at least one inertial measurement unit are arranged within a single housing and wherein the first, the second and the third sensor data stream are received concurrently, and
  determine, based on at least one of the first, the second and the third sensor data stream, at least one characteristic of a user action, determine, based on the determined at least one characteristic of a user action, at least one user action, and
generate at least one user interface, UI, command, based at least in part on the determined at least one user action,
wherein at least one of the first, the second or the third sensor data stream is preprocessed in a separate preprocessing sequence from the other data streams.

* * * * *